United States Patent
Bittner

(10) Patent No.: US 12,487,017 B2
(45) Date of Patent: Dec. 2, 2025

(54) $CO_2$ REFRIGERATION SYSTEM WITH SUPERCRITICAL SUBCOOLING CONTROL

(71) Applicant: Hill Phoenix, Inc., Conyers, GA (US)

(72) Inventor: John D. Bittner, Conyers, GA (US)

(73) Assignee: Hill Phoenix, Inc., Conyers, GA (US)

( * ) Notice: Subject to any disclaimer, the term of this patent is extended or adjusted under 35 U.S.C. 154(b) by 223 days.

(21) Appl. No.: 18/205,052

(22) Filed: Jun. 2, 2023

(65) Prior Publication Data
US 2024/0401860 A1 Dec. 5, 2024

(51) Int. Cl.
| | |
|---|---|
| *F25B 49/02* | (2006.01) |
| *F25B 9/00* | (2006.01) |
| *F25B 9/10* | (2006.01) |

(52) U.S. Cl.
CPC ............ F25B 49/027 (2013.01); F25B 9/008 (2013.01); F25B 9/10 (2013.01); *F25B 2309/061* (2013.01); *F25B 2600/19* (2013.01); *F25B 2600/2503* (2013.01); *F25B 2700/195* (2013.01); *F25B 2700/21163* (2013.01)

(58) Field of Classification Search
CPC .......... F25B 49/027; F25B 9/008; F25B 9/10; F25B 2600/2503
See application file for complete search history.

(56) References Cited

U.S. PATENT DOCUMENTS

| | | |
|---|---|---|
| 4,270,363 A | 6/1981 | Maring et al. |
| 4,589,263 A | 5/1986 | Dicarlo et al. |
| 5,425,246 A | 6/1995 | Bessler |
| | (Continued) | |

FOREIGN PATENT DOCUMENTS

| | | |
|---|---|---|
| EP | 1848933 | 12/2010 |
| EP | 1789732 | 3/2011 |
| | (Continued) | |

OTHER PUBLICATIONS

[No Author Listed], "Heat recovery from CO2 based refrigeration systems," Advansor Energisystemer, dated Mar. 26, 2008, 5 pages.

(Continued)

*Primary Examiner* — David J Teitelbaum
(74) *Attorney, Agent, or Firm* — Fish & Richardson P.C.

(57) ABSTRACT

Systems and method for operating a refrigeration system include a heat exchanger configured to remove heat from a refrigerant and discharge the refrigerant into a conduit. A temperature sensor, a pressure sensor, and a pressure control valve are located along the conduit. A controller is configured to determine that the refrigerant leaving the heat exchanger is outside of a subcritical region based on the measured temperature or measured pressure of the refrigerant. A target temperature is determined based at least in part on a pseudo-subcooling temperature value and the measured temperature of the refrigerant. A supercritical pseudo-saturated pressure is determined based on the target temperature. A pressure offset is determined based on the target temperature, a maximum operating pressure of the refrigeration system, and an offset factor. The pressure control valve is operated to drive the pressure to a target pressure based on the pressure offset and the pseudo-saturated pressure.

24 Claims, 9 Drawing Sheets

(56) References Cited

U.S. PATENT DOCUMENTS

| | | | |
|---|---|---|---|
| 5,539,382 | A | 7/1996 | Duff et al. |
| 6,385,980 | B1 | 5/2002 | Sienel |
| 6,415,611 | B1 | 7/2002 | Acharya et al. |
| 6,418,735 | B1 | 7/2002 | Sienel |
| 7,065,979 | B2 | 6/2006 | Arshansky et al. |
| 7,406,837 | B2 | 8/2008 | Nemoto et al. |
| 7,849,701 | B2 | 12/2010 | Bittner |
| 7,913,506 | B2 | 3/2011 | Bittner et al. |
| 8,006,507 | B2 | 8/2011 | Bittner |
| 8,011,192 | B2 | 9/2011 | Gupte |
| 8,511,103 | B2 | 8/2013 | Welch |
| 8,590,328 | B2 | 11/2013 | Bittner et al. |
| 8,631,666 | B2 | 1/2014 | Hinde et al. |
| 8,756,947 | B2 | 6/2014 | Chen et al. |
| 8,966,934 | B2 | 3/2015 | Christensen |
| 8,973,379 | B2 | 3/2015 | Bittner et al. |
| 9,121,631 | B2 | 9/2015 | Cho et al. |
| 9,151,521 | B2 | 10/2015 | Bittner |
| 9,335,079 | B2 | 5/2016 | Huff et al. |
| 9,353,980 | B2 | 5/2016 | Ignatiev |
| 9,377,236 | B2 | 6/2016 | Hinde et al. |
| 9,395,112 | B2 | 7/2016 | Prins |
| 9,470,435 | B2 | 10/2016 | Hinde et al. |
| 9,541,311 | B2 | 1/2017 | Hinde et al. |
| 9,625,183 | B2 | 4/2017 | Wallace et al. |
| 9,657,973 | B2 | 5/2017 | Bittner et al. |
| 9,657,977 | B2 | 5/2017 | Hinde et al. |
| 9,664,420 | B2 | 5/2017 | Bittner et al. |
| 9,664,424 | B2 | 5/2017 | Hinde et al. |
| 9,689,590 | B2 | 6/2017 | Christensen |
| 10,663,201 | B2 | 5/2020 | Hayes |
| 11,029,068 | B2 | 6/2021 | Newel et al. |
| 11,287,165 | B2 | 3/2022 | Bittner |
| 11,397,032 | B2 | 7/2022 | Newel et al. |
| 11,668,499 | B2 | 6/2023 | Bittner |
| 11,852,391 | B2 | 12/2023 | Newel et al. |
| 11,940,186 | B2 | 3/2024 | Newel et al. |
| 2003/0182961 | A1 | 10/2003 | Nishida et al. |
| 2005/0011221 | A1 | 1/2005 | Hirota |
| 2005/0217278 | A1 | 10/2005 | Mongia et al. |
| 2006/0277932 | A1* | 12/2006 | Otake ................... F25B 1/10 62/196.1 |
| 2008/0022706 | A1* | 1/2008 | Sakimichi ................ F25B 1/10 62/190 |
| 2008/0098754 | A1 | 5/2008 | Sommer et al. |
| 2008/0196420 | A1 | 8/2008 | Gernemann |
| 2008/0264077 | A1 | 10/2008 | Heinkbokel |
| 2009/0217686 | A1 | 9/2009 | Bittner |
| 2009/0260381 | A1 | 10/2009 | Bredberg et al. |
| 2009/0293517 | A1 | 12/2009 | Bittner |
| 2009/0293523 | A1 | 12/2009 | Bittner et al. |
| 2010/0000245 | A1 | 1/2010 | Kasahara et al. |
| 2010/0023171 | A1 | 1/2010 | Bittner et al. |
| 2010/0199707 | A1 | 8/2010 | Pearson |
| 2010/0263393 | A1 | 10/2010 | Chen et al. |
| 2011/0023514 | A1 | 2/2011 | Mitra et al. |
| 2011/0036110 | A1 | 2/2011 | Fujimoto et al. |
| 2011/0041527 | A1 | 2/2011 | Jakobsen et al. |
| 2011/0162397 | A1 | 7/2011 | Huff et al. |
| 2011/0167847 | A1 | 7/2011 | Bittner |
| 2011/0185757 | A1 | 8/2011 | Bittner et al. |
| 2011/0314843 | A1 | 12/2011 | Heinbokel et al. |
| 2012/0000237 | A1 | 1/2012 | Yamada et al. |
| 2012/0011866 | A1 | 1/2012 | Scarcella et al. |
| 2012/0055182 | A1 | 3/2012 | Dube |
| 2012/0073319 | A1 | 3/2012 | Dube |
| 2012/0117996 | A1 | 5/2012 | Hinde et al. |
| 2012/0192579 | A1 | 8/2012 | Huff et al. |
| 2012/0247148 | A1 | 10/2012 | Dube |
| 2013/0091891 | A1 | 4/2013 | Hinde et al. |
| 2013/0125569 | A1 | 5/2013 | Verma et al. |
| 2013/0233009 | A1 | 9/2013 | Dube |
| 2013/0263613 | A1 | 10/2013 | Bittner et al. |
| 2013/0298593 | A1 | 11/2013 | Christensen |
| 2014/0007603 | A1 | 1/2014 | Dube |
| 2014/0116075 | A1 | 5/2014 | Prins |
| 2014/0157811 | A1 | 6/2014 | Shimazu et al. |
| 2014/0208785 | A1 | 7/2014 | Wallace et al. |
| 2014/0291411 | A1 | 10/2014 | Tmaki et al. |
| 2014/0352343 | A1 | 12/2014 | Hinde et al. |
| 2015/0052927 | A1 | 2/2015 | Yang et al. |
| 2015/0128628 | A1 | 5/2015 | Kawagoe et al. |
| 2015/0253044 | A1 | 9/2015 | Bittner et al. |
| 2015/0345835 | A1 | 12/2015 | Martin et al. |
| 2015/0354882 | A1 | 12/2015 | Dube |
| 2016/0102901 | A1 | 4/2016 | Christensen et al. |
| 2016/0245575 | A1 | 8/2016 | Dube |
| 2016/0363356 | A1 | 12/2016 | Hinde et al. |
| 2017/0363337 | A1 | 12/2017 | Swofford et al. |
| 2018/0216851 | A1 | 8/2018 | Christensen et al. |
| 2019/0368786 | A1 | 12/2019 | Newel et al. |
| 2020/0033039 | A1 | 1/2020 | Krishnamoorth et al. |
| 2020/0124330 | A1* | 4/2020 | Hayes ................... F25B 40/06 |
| 2021/0364198 | A1 | 11/2021 | Bittner |
| 2021/0364210 | A1 | 11/2021 | Newel et al. |
| 2022/0178594 | A1 | 6/2022 | Bittner |
| 2022/0357081 | A1 | 11/2022 | Newel et al. |

FOREIGN PATENT DOCUMENTS

| | | |
|---|---|---|
| EP | 2078178 | 5/2016 |
| EP | 2329206 | 10/2016 |
| EP | 2212631 | 12/2016 |
| GB | 2460726 | 12/2009 |
| JP | 2004257694 | 9/2004 |
| JP | 2005024210 | 1/2005 |
| JP | 2007139209 | 6/2007 |
| JP | 2011503504 | 1/2011 |
| WO | WO 2006/087011 | 8/2006 |
| WO | WO 2006/091190 | 8/2006 |
| WO | WO 2009/086493 | 7/2009 |
| WO | WO 2010/045743 | 4/2010 |
| WO | WO 2011/066214 | 6/2011 |
| WO | WO-2013004233 A1 * | 1/2013 ............ F25B 41/39 |
| WO | WO 2013/169591 | 11/2013 |
| WO | WO 2014/068967 | 5/2014 |
| WO | WO 2014/179699 | 11/2014 |

OTHER PUBLICATIONS

[No Author Listed], "Heos high efficiency showcase controller (user manual)," Carel Industries, dated Sep. 24, 2015, 56 pages.

Co2oltec, "A world first in technology: Refrigeration with CO2," special print from KK Die Kalte & Klimatechnik, Edition Feb. 2005, Feb. 2005, 15 pages.

International Search Report and Written Opinion in International Appln. No. PCT/US2024/031920, mailed on Aug. 8, 2024, 14 pages.

* cited by examiner

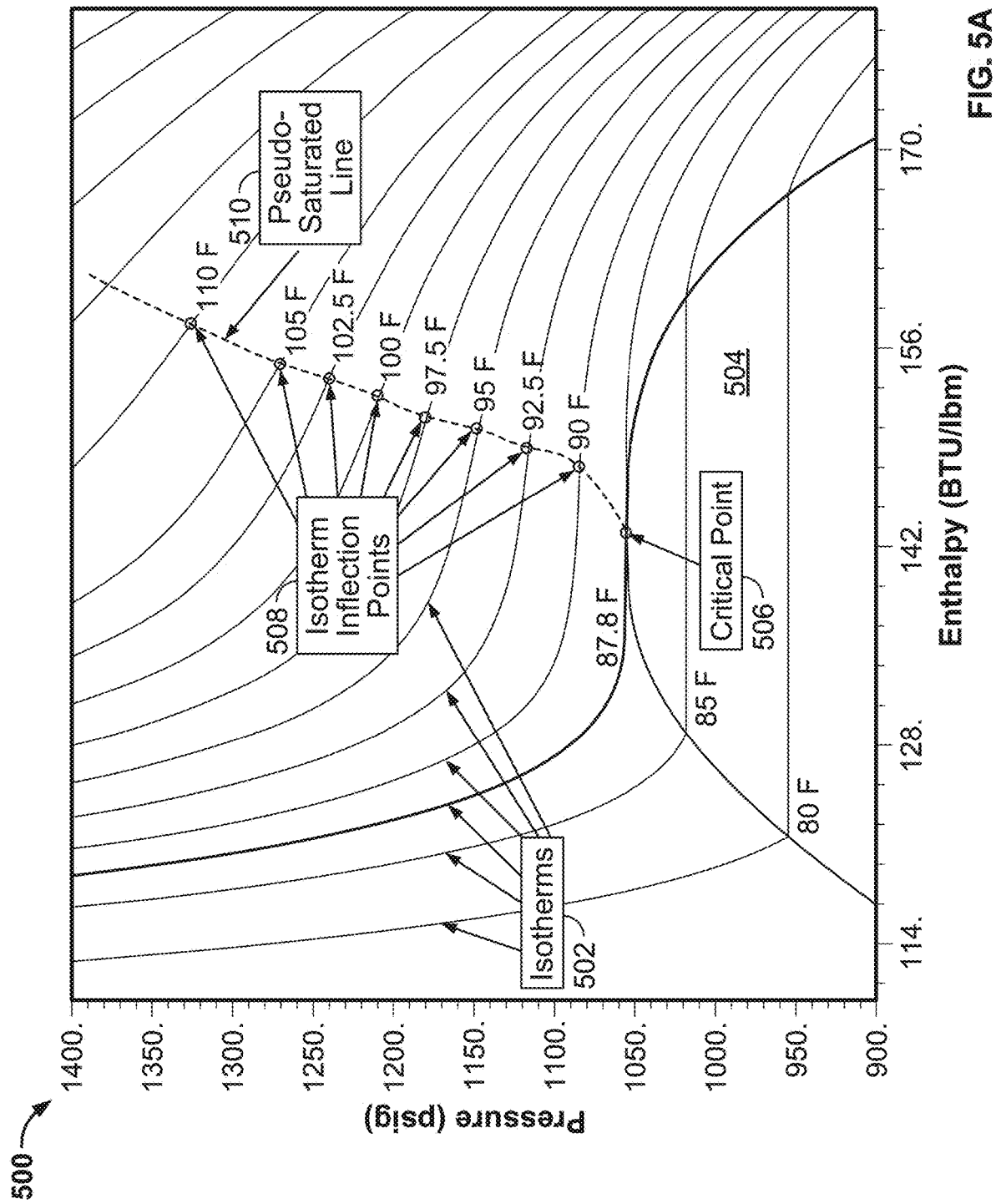

CO₂ REFRIGERATION SYSTEM WITH SUPERCRITICAL SUBCOOLING CONTROL

TECHNICAL FIELD

The present disclosure relates to a refrigeration system.

BACKGROUND

Refrigeration systems are often used to provide cooling to temperature-controlled display devices (e.g., cases, merchandisers, etc.) in supermarkets and other similar facilities. Vapor compression refrigeration systems are a type of refrigeration system that provide such cooling by circulating a fluid refrigerant (e.g., a liquid and/or vapor) through a thermodynamic vapor compression cycle. In a vapor compression cycle, the refrigerant is typically (1) compressed to a high temperature/pressure state (e.g., by a compressor of the refrigeration system), (2) cooled/condensed to a lower temperature state (e.g., in a gas cooler or condenser which absorbs heat from the refrigerant), (3) expanded to a lower pressure (e.g., through an expansion valve), and (4) evaporated to provide cooling by absorbing heat into the refrigerant.

SUMMARY

This disclosure describes methods and systems for operating a refrigeration system. The refrigeration system can be, for example, a transcritical carbon dioxide ($CO_2$) refrigeration system.

In an example implementation, a refrigeration system includes a heat exchanger configured to remove heat from a refrigerant and discharge the refrigerant into a conduit; a temperature sensor located along the conduit and configured to measure a temperature of the refrigerant discharging from the heat exchanger; a pressure sensor located along the conduit and configured to measure a pressure of the refrigerant discharging from the heat exchanger; a pressure control valve located along the conduit and operable to regulate the pressure of the refrigerant leaving the heat exchanger; and a controller communicably coupled to the temperature sensor, the pressure sensor, and the pressure control valve. The controller is configured to perform operations including determining that the refrigerant leaving the heat exchanger is outside of a subcritical region based on at least one of the measured temperature of the refrigerant or the measured pressure of the refrigerant; determining a target temperature that is based at least in part on a pseudo-subcooling temperature value and the measured temperature of the refrigerant; determining a supercritical pseudo-saturated pressure based on the target temperature; determining a pressure offset based on the target temperature, a maximum operating pressure of the refrigeration system, and an offset factor; and operating the pressure control valve to drive the pressure of the refrigerant leaving the heat exchanger to a target pressure that is based on the supercritical pseudo-saturated pressure and the pressure offset.

In an aspect combinable with the example implementations, the offset factor includes a user specified value.

In another aspect combinable with any of the previous aspects, the offset factor includes a dynamic value, and the operations further include determining the dynamic value of the offset factor based at least in part on the measured temperature of the refrigerant, a dynamic offset factor enable setpoint, and the maximum operating pressure of the system.

In another aspect combinable with any of the previous aspects, the operation of determining the dynamic value of the offset factor is further based on a user specified vapor ratio of a flash tank.

In another aspect combinable with any of the previous aspects, the operation of determining a target temperature includes a sum of the pseudo-subcooling temperature value and the measured temperature of the refrigerant.

In another aspect combinable with any of the previous aspects, the target pressure includes a sum of the supercritical pseudo-saturated pressure and the pressure offset.

In another aspect combinable with any of the previous aspects, the operations further include generating a supercritical pseudo-saturation function for the refrigerant using supercritical pressure (P), enthalpy (H), and temperature (T) data for the refrigerant; and determining the supercritical pseudo-saturated pressure using the supercritical pseudo-saturation function.

In another aspect combinable with any of the previous aspects, the operation of generating the supercritical pseudo-saturation function includes identifying inflection points of supercritical P-H isotherms for the refrigerant using the supercritical P-H-T data for the refrigerant; and deriving the supercritical pseudo-saturation function from the inflection points of the supercritical isotherms.

In another aspect combinable with any of the previous aspects, the operation of deriving the supercritical pseudo-saturation function from the inflection points of the supercritical isotherms includes fitting a supercritical pseudo-saturated line to the inflection points of the supercritical isotherms.

In another aspect combinable with any of the previous aspects, the pseudo-subcooling temperature value is a dynamic value, and the operations further include determining the dynamic pseudo-subcooling temperature value based at least in part on the measured temperature of the refrigerant discharging from the heat exchanger.

In another aspect combinable with any of the previous aspects, the operation of determining the dynamic pseudo-subcooling temperature value includes a function including a negative slope.

In another aspect combinable with any of the previous aspects, the pseudo-subcooling temperature value is one of a plurality of pseudo-subcooling temperature values, each of which applies to a corresponding temperature of the refrigerant discharging from the heat exchanger; and default values of the plurality of pseudo-subcooling temperature values are adjustable by a user to control the pressure of the refrigerant discharging from the heat exchanger to higher or lower pressures at any measured temperature of the refrigerant discharging from the heat exchanger.

In another aspect combinable with any of the previous aspects, the operations further include determining that the refrigerant discharging from the heat exchanger is in the subcritical region; determining a second target temperature based on a fixed temperature value and the measured temperature of the refrigerant; determining a subcritical saturated pressure based on the second target temperature; and operating the pressure control valve to drive the pressure of the refrigerant discharging from the heat exchanger to the subcritical saturated pressure corresponding to the second target temperature.

In another example implementation, a method includes operating a refrigeration system that includes a heat exchanger configured to remove heat from a refrigerant and discharge the refrigerant into a conduit, a temperature sensor located along the conduit, a pressure sensor located along the conduit, and a pressure control valve located along the conduit; measuring a temperature of the refrigerant discharging from the heat exchanger; measuring a pressure of the refrigerant discharging from the heat exchanger; determining that the refrigerant discharging from the heat exchanger is outside of a subcritical region based on at least one of the measured temperature of the refrigerant or the measured pressure of the refrigerant; determining a target temperature that is based at least in part on a pseudo-subcooling temperature value and the measured temperature of the refrigerant; determining a supercritical pseudo-saturated pressure based on the target temperature; determining a pressure offset based on the target temperature, a maximum operating pressure of the refrigeration system, and an offset factor; and operating the pressure control valve to drive the pressure of the refrigerant discharging from the heat exchanger to a target pressure that is based on the supercritical pseudo-saturated pressure and the pressure offset.

In an aspect combinable with the example implementation, the offset factor includes a user specified value.

In another aspect combinable with any of the previous aspects, the offset factor includes a dynamic value, and the method further includes determining the dynamic value of the offset factor based at least in part on the measured temperature of the refrigerant, a dynamic offset factor enable setpoint, and the maximum operating pressure of the system.

In another aspect combinable with any of the previous aspects, determining the dynamic value of the offset factor is further based on a user specified vapor ratio of a flash tank.

In another aspect combinable with any of the previous aspects, determining a target temperature includes a sum of the pseudo-subcooling temperature value and the measured temperature of the refrigerant.

In another aspect combinable with any of the previous aspects, the target pressure includes a sum of the supercritical pseudo-saturated pressure and the pressure offset.

Another aspect combinable with any of the previous aspects, further includes generating a supercritical pseudo-saturation function for the refrigerant using supercritical pressure (P), enthalpy (H), and temperature (T) data for the refrigerant; and determining the supercritical pseudo-saturated pressure using the supercritical pseudo-saturation function.

In another aspect combinable with any of the previous aspects, generating the supercritical pseudo-saturation function includes identifying inflection points of supercritical P-H isotherms for the refrigerant using the supercritical P-H-T data for the refrigerant; and deriving the supercritical pseudo-saturation function from the inflection points of the supercritical isotherms.

In another aspect combinable with any of the previous aspects, deriving the supercritical pseudo-saturation function from the inflection points of the supercritical isotherms includes fitting a supercritical pseudo-saturated line to the inflection points of the supercritical isotherms.

In another aspect combinable with any of the previous aspects, the pseudo-subcooling temperature value is a dynamic value, and the method further includes determining the dynamic pseudo-subcooling temperature value based at least in part on the measured temperature of the refrigerant discharging from the heat exchanger.

In another aspect combinable with any of the previous aspects, the determining the dynamic pseudo-subcooling temperature value includes a function including a negative slope.

In another aspect combinable with any of the previous aspects, the pseudo-subcooling temperature value is one of a plurality of pseudo-subcooling temperature values, each of which applies to a corresponding temperature of the refrigerant discharging from the heat exchanger; and default values of the plurality of pseudo-subcooling temperature values are adjustable by a user to control the pressure of the refrigerant discharging from the heat exchanger to higher or lower pressures at any measured temperature of the refrigerant discharging from the heat exchanger.

Another aspect combinable with any of the previous aspects, further includes determining that the refrigerant discharging from the heat exchanger is in the subcritical region; determining a second target temperature based on a fixed temperature value and the measured temperature of the refrigerant; determining a subcritical saturated pressure based on the second target temperature; and operating the pressure control valve to drive the pressure of the refrigerant discharging from the heat exchanger to the subcritical saturated pressure corresponding to the second target temperature.

Particular implementations of the subject matter described in this specification can be implemented to realize one or more of the following advantages. Controlling the pressure of the high pressure valve to a pressure above the saturated or pseudo-saturated pressure condition of the refrigerant can condense more liquid in the receiver tank providing sustained cooling power. The pressure offset factor can be determined based on a desired vapor ratio in the receiver tank. The pressure offset factor can dynamically control the amount of subcooling of the refrigerant based on operating conditions and operating temperature and pressure ranges. The controller can determine a pressure setpoint for each temperature that converges to the pseudo-saturated line as the temperature rises. The refrigeration system can be operated at a higher efficiency point based on the pressure offset factor. The pressure offset factor can be reduced to control the set point to be closer to the pseudo-saturation pressure value to prevent a high pressure shutdown of the refrigeration system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A is an example P-H diagram showing inflection points of the isotherms of the $CO_2$ refrigerant and a pseudo-saturated line passes through or best fits the inflection points of the isotherms, according to an exemplary embodiment.

DETAILED DESCRIPTION

A $CO_2$ refrigeration system can be a vapor compression refrigeration system which uses primarily carbon dioxide ($CO_2$) as a refrigerant. In some implementations, the $CO_2$ refrigeration system is used to provide cooling for temperature controlled display devices in a supermarket or other similar facility.

Generally, heat absorption and heat rejection are two of the four thermodynamic paths that make up the vapor compression cycle. Both heat absorption and heat rejection take advantage of latent heat transfer, causing a refrigerant to change state from a saturated liquid to saturated vapor (i.e., evaporation) or from a saturated vapor to a saturated liquid (i.e., condensation). As heat is absorbed or rejected during evaporation and condensation, the pressure and the temperature can remain constant (this may not be the case if the refrigerant is a blend of refrigerants that exhibit different saturation characteristics). Any heat transfer that occurs outside of this phase changing process is known as sensible heat transfer and results in a change in temperature of the refrigerant. Sensible heat transfer can be defined as either a subcooling of liquid or a superheating of gas. When pressure is constant and the temperature of a refrigerant decreases below its saturated temperature at that pressure, its subcooling value increases. Likewise, when pressure is constant and the temperature of the refrigerant increases above its saturation temperature at that pressure, its superheating value increases. Alternatively, if the temperature remains constant, subcooling and superheating can be achieved by either increasing the pressure of the refrigerant above its saturation pressure at that temperature or decreasing the pressure of the refrigerant below its saturation pressure at that temperature, respectively. Some refrigeration systems seek to achieve a subcooling setpoint by increasing the pressure of a refrigerant to be greater than its saturation pressure. However, a refrigerant not in a subcritical region (i.e., having a temperature above the critical temperature of the refrigerant) does not have the capability of latent heat transfer (condensing or evaporating) and thus cannot be condensed isothermally by increasing its pressure. Therefore, a refrigerant having a temperature greater than its critical temperature has no corresponding saturation pressure. For this reason, it is common for non-subcooling control schemes (such as methods to maximize system COP) to be implemented to control the high side of supercritical vapor compression cycle systems.

Figure 1:
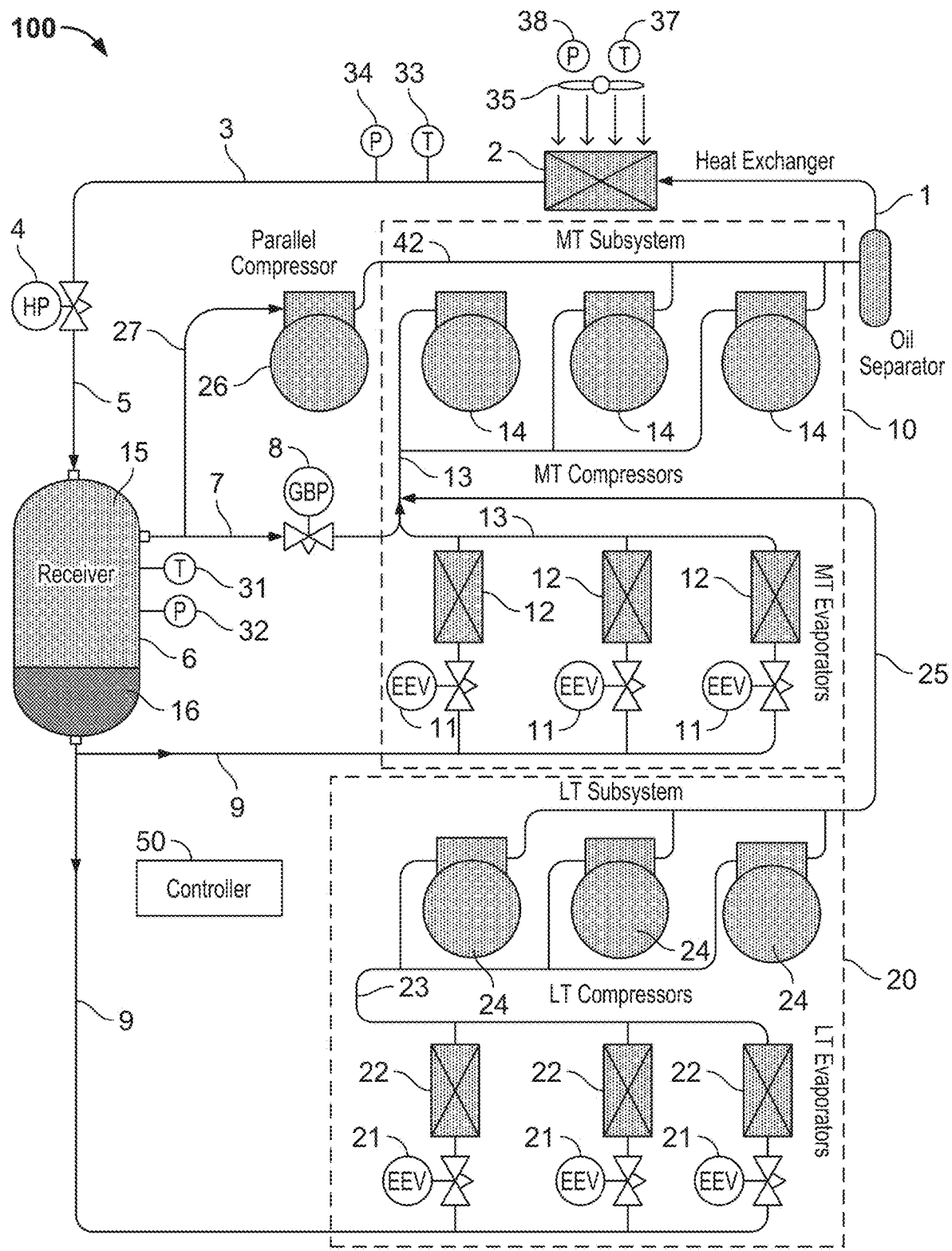
FIG. 1 is a schematic representation of an exemplary $CO_2$ refrigeration system having a $CO_2$ refrigeration circuit, a receiving tank for containing a mixture of liquid and vapor $CO_2$ refrigerant, and a gas bypass valve fluidly connected with the receiving tank for controlling a pressure within the receiving tank.

FIG. 1 shows an example $CO_2$ refrigeration system 100. $CO_2$ refrigeration system 100 can be a vapor compression refrigeration system which uses primarily carbon dioxide ($CO_2$) as a refrigerant. However, it is contemplated that other refrigerants can be substituted for $CO_2$ without departing from the teachings of the present disclosure. $CO_2$ refrigeration system 100 includes a system of pipes, conduits, or other fluid channels (e.g., fluid conduits 1, 3, 5, 7, 9, 13, 23, 25, 27, and 42) for transporting the $CO_2$ refrigerant between various components of $CO_2$ refrigeration system 100. The components of $CO_2$ refrigeration system 100 are shown to include a heat exchanger 2, a high pressure valve 4, a receiver 6, a gas bypass valve 8, a medium-temperature ("MT") subsystem 10, and a low-temperature ("LT") subsystem 20. In some implementations, $CO_2$ refrigeration system 100 includes a parallel compressor 26 which can replace high pressure valve 4 or work in parallel with high pressure valve 4. Parallel compressor 26 can be implemented with an ejector or without the ejector. Both parallel compressor 26 and the ejector are described in greater detail below.

Heat exchanger 2 can be a heat exchanger or other similar device for removing heat from the $CO_2$ refrigerant. Heat exchanger 2 is shown receiving $CO_2$ gas from fluid conduit 1. In some implementations, the $CO_2$ gas in fluid conduit 1 can have a pressure within a range from approximately 45 bar to approximately 100 bar (i.e., about 650 psig to about 1450 psig), depending on ambient temperature and other operating conditions. In some implementations, heat exchanger 2 can partially or fully condense $CO_2$ gas into liquid $CO_2$ (e.g., if system operation is in a subcritical region). The condensation process can result in fully saturated $CO_2$ liquid or a two-phase liquid-vapor mixture (e.g., having a thermodynamic vapor quality between 0 and 1). In other implementations, heat exchanger 2 can cool the $CO_2$ gas (e.g., by removing only sensible heat) without condensing the $CO_2$ gas into $CO_2$ liquid (e.g., if system operation is in a supercritical region). In some implementations, the cooling/condensation process can be assumed to be an isobaric process. Heat exchanger 2 is shown outputting the cooled and/or condensed $CO_2$ refrigerant into fluid conduit 3.

In some implementations, $CO_2$ refrigeration system 100 includes a temperature sensor 33 and a pressure sensor 34 configured to measure the temperature and pressure of the $CO_2$ refrigerant exiting heat exchanger 2. Sensors 33 and 34 can be installed along fluid conduit 3 (as shown in FIG. 1), within heat exchanger 2, or otherwise positioned to measure the temperature and pressure of the $CO_2$ refrigerant exiting heat exchanger 2. In some implementations, $CO_2$ refrigeration system 100 includes a condenser fan 35 configured to provide airflow across heat exchanger 2. The speed of condenser fan 35 can be controlled to increase or decrease the airflow across heat exchanger 2 to modulate the amount of cooling applied to the $CO_2$ refrigerant within heat exchanger 2. In some implementations, $CO_2$ refrigeration system 100 also includes a temperature sensor 37 and/or a pressure sensor 38 configured to measure the temperature and/or pressure of the ambient air that flows across heat exchanger 2 to provide cooling for the $CO_2$ refrigerant contained therein.

High pressure valve 4 receives the cooled and/or condensed $CO_2$ refrigerant from fluid conduit 3 and outputs the $CO_2$ refrigerant to fluid conduit 5. High pressure valve 4 can be operated to control the high side pressure of the $CO_2$ refrigerant (e.g., the pressure of the $CO_2$ refrigerant in fluid conduit 1, heat exchanger 2, and/or fluid conduit 3) by adjusting an amount of $CO_2$ refrigerant permitted to pass through high pressure valve 4. High pressure valve 4 can be operated automatically (e.g., by a controller 50) to control the high side pressure of the $CO_2$ refrigerant. In some implementations, $CO_2$ refrigeration system 100 includes an ejector in place of high pressure valve 4 or in parallel with high pressure valve 4. Like high pressure valve 4, the ejector can be operated automatically (e.g., by controller 50) to control the high side pressure of the $CO_2$ refrigerant. In some implementations, controller 50 receives measurements of the temperature and/or pressure of the $CO_2$ refrigerant exiting heat exchanger 2 from sensors 33-34. Controller 50 can calculate an appropriate high side pressure setpoint for the $CO_2$ refrigerant and can operate high pressure valve 4 to achieve the high side pressure setpoint within fluid conduit 1, heat exchanger 2, and/or fluid conduit 3. The high side pressure control performed by controller 50 is described in greater detail with reference to FIGS. 2-7.

In some implementations, high pressure valve 4 is a high pressure thermal expansion valve (e.g., if the pressure in fluid conduit 3 is greater than the pressure in fluid conduit 5). In such implementations, high pressure valve 4 can allow the $CO_2$ refrigerant to expand to a lower pressure state. The expansion process can be an isenthalpic and/or adiabatic expansion process, resulting in a two-phase flash of the high pressure $CO_2$ refrigerant to a lower pressure, lower temperature state. The expansion process can produce a liquid/vapor mixture (e.g., having a thermodynamic vapor quality between 0 and 1). In some implementations, the $CO_2$ refrigerant expands to a pressure of approximately 38 bar (e.g., about 550 psig), which corresponds to a temperature of approximately 400° F. The $CO_2$ refrigerant then flows from fluid conduit 5 into receiver 6.

Receiver 6 collects the $CO_2$ refrigerant from fluid conduit 5. In some implementations, receiver 6 can be a flash tank or other fluid reservoir. Receiver 6 includes a $CO_2$ liquid portion 16 and a $CO_2$ vapor portion 15 and can contain a partially saturated mixture of $CO_2$ liquid and $CO_2$ vapor. In some implementations, receiver 6 separates the $CO_2$ liquid from the $CO_2$ vapor. The $CO_2$ liquid can exit receiver 6 through fluid conduits 9. Fluid conduits 9 can be liquid headers leading to MT subsystem 10 and/or LT subsystem 20. The $CO_2$ vapor can exit receiver 6 through fluid conduit 7. Fluid conduit 7 is shown leading the $CO_2$ vapor to a gas bypass valve 8 and a parallel compressor 26 (described in greater detail below). In some implementations, $CO_2$ refrigeration system 100 includes a temperature sensor 31 and a pressure sensor 32 configured to measure the temperature and pressure within receiver 6. Sensors 31 and 32 can be installed in or on receiver 6 (as shown in FIG. 1) or along any of the fluid conduits that contain $CO_2$ refrigerant at the same temperature and/or pressure as receiver 6 (e.g., fluid conduits 5, 7, 9, or 27).

Still referring to FIG. 1, MT subsystem 10 is shown to include one or more expansion valves 11, one or more MT evaporators 12, and one or more MT compressors 14. In various implementations, any number of expansion valves 11, MT evaporators 12, and MT compressors 14 can be present. Expansion valves 11 can be electronic expansion valves or other similar expansion valves. Expansion valves 11 are shown receiving liquid $CO_2$ refrigerant from fluid conduit 9 and outputting the $CO_2$ refrigerant to MT evaporators 12. Expansion valves 11 can cause the $CO_2$ refrigerant to undergo a rapid drop in pressure, thereby expanding the $CO_2$ refrigerant to a lower pressure, lower temperature two-phase state. In some implementations, expansion valves 11 can expand the $CO_2$ refrigerant to a pressure of approximately 25 bar-33 bar and a temperature of approximately 13° F.-30° F. The expansion process can be an isenthalpic and/or adiabatic expansion process.

MT evaporators 12 are shown receiving the cooled and expanded $CO_2$ refrigerant from expansion valves 11. In some implementations, MT evaporators can be associated with display cases/devices (e.g., if $CO_2$ refrigeration system 100 is implemented in a supermarket setting). MT evaporators 12 can be configured to facilitate the transfer of heat from the display cases/devices into the $CO_2$ refrigerant. The added heat can cause the $CO_2$ refrigerant to evaporate partially or completely. In some implementations, the $CO_2$ refrigerant is fully evaporated in MT evaporators 12. In some implementations, the evaporation process can be an isobaric process. MT evaporators 12 are shown outputting the $CO_2$ refrigerant via suction line 13, leading to MT compressors 14.

MT compressors 14 compress the $CO_2$ refrigerant into a superheated gas having a pressure within a range of approximately 45 bar to approximately 100 bar. The output pressure from MT compressors 14 can vary depending on ambient temperature and other operating conditions. In some implementations, MT compressors 14 operate in a transcritical mode. In operation, the $CO_2$ discharge gas exits MT compressors 14 and flows through fluid conduit 1 into heat exchanger 2.

Still referring to FIG. 1, LT subsystem 20 is shown to include one or more expansion valves 21, one or more LT evaporators 22, and one or more LT compressors 24. In various implementations, any number of expansion valves 21, LT evaporators 22, and LT compressors 24 can be present. In some implementations, LT subsystem 20 can be omitted and the $CO_2$ refrigeration system 100 can operate with an air conditioning (AC) module or parallel compressor 26 interfacing with only MT subsystem 10.

Expansion valves 21 can be electronic expansion valves or other similar expansion valves. Expansion valves 21 are shown receiving liquid $CO_2$ refrigerant from fluid conduit 9 and outputting the $CO_2$ refrigerant to LT evaporators 22. Expansion valves 21 can cause the $CO_2$ refrigerant to undergo a rapid drop in pressure, thereby expanding the $CO_2$ refrigerant to a lower pressure, lower temperature two-phase state. The expansion process can be an isenthalpic and/or adiabatic expansion process. In some implementations, expansion valves 21 can expand the $CO_2$ refrigerant to a lower pressure than expansion valves 11, thereby resulting in a lower temperature $CO_2$ refrigerant. Accordingly, LT subsystem 20 can be used in conjunction with a freezer system or other lower temperature display cases.

LT evaporators 22 are shown receiving the cooled and expanded $CO_2$ refrigerant from expansion valves 21. In some implementations, LT evaporators can be associated with display cases/devices (e.g., if $CO_2$ refrigeration system 100 is implemented in a supermarket setting). LT evaporators 22 can be configured to facilitate the transfer of heat from the display cases/devices into the $CO_2$ refrigerant. The added heat can cause the $CO_2$ refrigerant to evaporate partially or completely. In some implementations, the evaporation process can be an isobaric process. LT evaporators 22 are shown outputting the $CO_2$ refrigerant via suction line 23, leading to LT compressors 24.

LT compressors 24 compress the $CO_2$ refrigerant. In some implementations, LT compressors 24 can compress the $CO_2$ refrigerant to a pressure of approximately 30 bar (e.g., about 450 psig) having a saturation temperature of approximately 23° F. In some implementations, LT compressors 24 operate in a subcritical mode. LT compressors 24 are shown outputting the $CO_2$ refrigerant through discharge line 25. Discharge line 25 can be fluidly connected with the suction (e.g., upstream) side of MT compressors 14.

Still referring to FIG. 1, $CO_2$ refrigeration system 100 is shown to include a gas bypass valve 8. Gas bypass valve 8 can receive the $CO_2$ vapor from fluid conduit 7 and output the $CO_2$ refrigerant to MT subsystem 10. In some implementations, gas bypass valve 8 is arranged in series with MT compressors 14. In other words, $CO_2$ vapor from receiver 6 can pass through both gas bypass valve 8 and MT compressors 14. MT compressors 14 can compress the $CO_2$ vapor passing through gas bypass valve 8 from a low pressure state (e.g., approximately 30 bar or lower) to a high pressure state (e.g., 45-100 bar).

Gas bypass valve 8 can be operated to regulate or control the pressure within receiver 6 (e.g., by adjusting an amount of $CO_2$ refrigerant permitted to pass through gas bypass valve 8). For example, gas bypass valve 8 can be adjusted (e.g., variably opened or closed) to adjust the mass flow rate, volume flow rate, or other flow rates of the $CO_2$ refrigerant through gas bypass valve 8. Gas bypass valve 8 can be opened and closed (e.g., manually, automatically, by a controller, etc.) as needed to regulate the pressure within receiver 6.

In some implementations, gas bypass valve 8 includes a sensor for measuring a flow rate (e.g., mass flow, volume flow, etc.) of the $CO_2$ refrigerant through gas bypass valve 8. In other implementations, gas bypass valve 8 includes an indicator (e.g., a gauge, a dial, etc.) from which the position of gas bypass valve 8 can be determined. This position can be used to determine the flow rate of $CO_2$ refrigerant through gas bypass valve 8, as such quantities can be proportional or otherwise related.

In some implementations, gas bypass valve 8 can be a thermal expansion valve (e.g., if the pressure on the downstream side of gas bypass valve 8 is lower than the pressure in fluid conduit 7). In some implementations, the pressure within receiver 6 is regulated by gas bypass valve 8 to a pressure of approximately 38 bar, which corresponds to about 37° F. Advantageously, this pressure/temperature state can facilitate the use of copper tubing/piping for the downstream $CO_2$ lines of the system. Additionally, this pressure/temperature state can allow such copper tubing to operate in a substantially frost-free manner.

In some implementations, the $CO_2$ vapor that is bypassed through gas bypass valve 8 is mixed with the $CO_2$ refrigerant gas exiting MT evaporators 12 (e.g., via suction line 13). The bypassed $CO_2$ vapor can also mix with the discharge $CO_2$ refrigerant gas exiting LT compressors 24 (e.g., via discharge line 25). The combined $CO_2$ refrigerant gas can be provided to the suction side of MT compressors 14.

In some implementations, the pressure immediately downstream of gas bypass valve 8 (e.g., in suction line 13) is lower than the pressure immediately upstream of gas bypass valve 8 (e.g., in fluid conduit 7). Therefore, the $CO_2$ vapor passing through gas bypass valve 8 and MT compressors 14 can be expanded (e.g., when passing through gas bypass valve 8) and subsequently recompressed (e.g., by MT compressors 14). This expansion and recompression can occur without any intermediate transfers of heat to or from the $CO_2$ refrigerant, which can be characterized as an inefficient energy usage.

Still referring to FIG. 1, $CO_2$ refrigeration system 100 is shown to include a parallel compressor 26. Parallel compressor 26 can be arranged in parallel with MT compressors 14 and arranged in series with LT compressors 24. Although only one parallel compressor 26 is shown, any number of parallel compressors can be present. Parallel compressor 26 can be fluidly connected with receiver 6 and/or fluid conduit 7 via a connecting conduit 27. Parallel compressor 26 can be used to draw non-condensed $CO_2$ vapor from receiver 6 as a means for pressure control and regulation. Advantageously, using parallel compressor 26 to effectuate pressure control and regulation can provide a more efficient alternative to traditional pressure regulation techniques such as bypassing $CO_2$ vapor through bypass valve 8 to the lower pressure suction side of MT compressors 14.

In some implementations, parallel compressor 26 can be operated (e.g., by a controller 50) to achieve a desired pressure within receiver 6. For example, controller 50 can activate or deactivate parallel compressor 26 when the flow rate of the $CO_2$ refrigerant through gas bypass valve 8 exceeds a threshold value to assist with regulating the pressure within receiver 6. Parallel compressor 26 can have a minimum flow rate requirement and can activate and remain on as long as the flow rate of the $CO_2$ refrigerant through parallel compressor 26 is at least its minimum required flow rate. When active, parallel compressor 26 compresses the $CO_2$ vapor received via connecting conduit 27 and discharges the compressed gas into discharge line 42. Discharge line 42 can be fluidly connected with fluid conduit 1. Accordingly, parallel compressor 26 can operate in parallel with MT compressors 14 by discharging the compressed $CO_2$ gas into a shared fluid conduit (e.g., fluid conduit 1).

Parallel compressor 26 can be arranged in parallel with both gas bypass valve 8 and with MT compressors 14. $CO_2$ vapor exiting receiver 6 can pass through either parallel compressor 26 or the series combination of gas bypass valve 8 and MT compressors 14. Parallel compressor 26 can receive the $CO_2$ vapor at a relatively higher pressure (e.g., from fluid conduit 7) than the $CO_2$ vapor received by MT compressors 14 (e.g., from suction line 13). This differential in pressure can correspond to the pressure differential across gas bypass valve 8. In some implementations, parallel compressor 26 can require less energy to compress an equivalent amount of $CO_2$ vapor to the high pressure state (e.g., in fluid conduit 1) as a result of the higher pressure of $CO_2$ vapor entering parallel compressor 26. Therefore, the parallel route including parallel compressor 26 can be a more efficient alternative to the route including gas bypass valve 8 and MT compressors 14.

In some implementations, gas bypass valve 8 is omitted and the pressure within receiver 6 is regulated using parallel compressor 26. In other implementations, parallel compressor 26 is omitted and the pressure within receiver 6 is regulated using gas bypass valve 8. In other implementations, both gas bypass valve 8 and parallel compressor 26 are used to regulate the pressure within receiver 6. All such variations are within the scope of the present disclosure.

Figure 2:
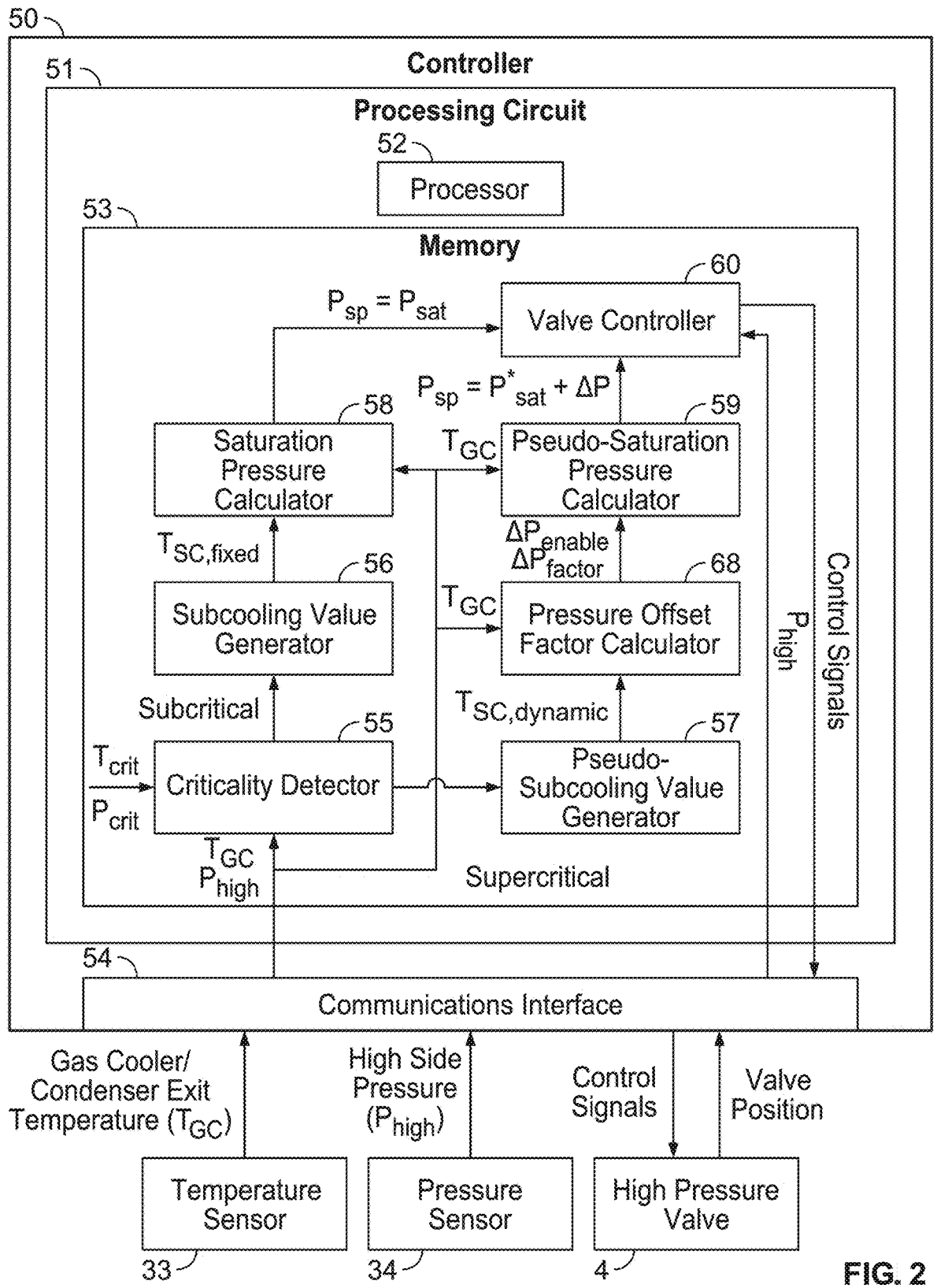
FIG. 2 is a block diagram of an example controller configured to control the $CO_2$ refrigeration system of FIG. 1.

FIG. 2 is a block diagram illustrating the example controller 50 in greater detail. Controller 50 can receive signals from one or more measurement devices (e.g., pressure sensors, temperature sensors, flow sensors, etc.) located within $CO_2$ refrigeration system 100. For example, controller 50 is shown receiving temperature and pressure measurements from sensors 33-34 and a valve position signal from high pressure valve 4. Although not explicitly shown in FIG. 2, controller 50 can also receive measurements from any of sensors 31-34 and 37-38, a fan speed signal from condenser fan 35, a valve position signal from gas bypass valve 8, and/or any other measurements or inputs from the various devices of $CO_2$ refrigeration system 100.

Controller 50 can use the input signals to determine appropriate control actions for controllable devices of $CO_2$ refrigeration system 100 (e.g., compressors 14 and 24, parallel compressor 26, condenser fan 35, valves 4, 8, 11, and 21, flow diverters, power supplies, etc.). For example, controller 50 is shown providing control signals to high pressure valve 4. Although not explicitly shown in FIG. 2, controller 50 can also provide control signals to MT compressors 14, LT compressors 24, parallel compressor 26, gas bypass valve 8, condenser fan 35, and/or any other controllable device of $CO_2$ refrigeration system 100.

In some implementations, controller 50 is configured to operate high pressure valve 4 to maintain the high side pressure $P_{high}$ of the $CO_2$ refrigerant (e.g., the pressure measured by pressure sensor 34) at a high side pressure setpoint $P_{sp}$. Controller 50 can generate the high side pressure setpoint $P_{sp}$ to ensure that the $CO_2$ refrigerant exiting heat exchanger 2 has a desired amount of subcooling. The desired amount of subcooling can vary depending on whether the $CO_2$ refrigerant exiting heat exchanger 2 is in a subcritical region or a supercritical region. In some implementations, controller 50 can compare the high side pressure $P_{high}$ of the $CO_2$ refrigerant exiting heat exchanger 2 (e.g., the pressure measured by pressure sensor 34) to the critical pressure $P_{crit}$ of the $CO_2$ refrigerant to determine whether the $CO_2$ refrigerant is in a supercritical region or subcritical region. In other implementations, controller 50 can compare the temperature $T_{GC}$ of the $CO_2$ refrigerant exiting heat exchanger 2 (i.e., the temperature measured by temperature sensor 33) to the critical temperature $T_{crit}$ of the $CO_2$ refrigerant to determine whether the $CO_2$ refrigerant is in a supercritical region or subcritical region.

In some implementations, if the high side pressure $P_{high}$ of the $CO_2$ refrigerant exiting heat exchanger 2 is less than the critical pressure $P_{crit}$ (i.e., $P_{high}<P_{crit}$), controller 50 can determine that the $CO_2$ refrigerant is in a subcritical region. In other implementations, if the temperature $T_{GC}$ of the $CO_2$ refrigerant exiting heat exchanger 2 is less than the critical temperature $T_{crit}$ (i.e., $T_{GC}<T_{crit}$), controller 50 can determine that the $CO_2$ refrigerant is in a subcritical region. In response to determining that the $CO_2$ refrigerant is in a subcritical region, controller 50 can identify a predetermined or fixed subcooling value $T_{SC,fixed}$. Controller 50 can then add the fixed subcooling value $T_{SC,fixed}$ to the measured temperature $T_{GC}$ and identify a corresponding saturation pressure $P_{sat}(T_{GC}+T_{SC,fixed})$, where the function $P_{sat}(\ )$ calculates the saturation pressure $P_{sat}$ of the $CO_2$ refrigerant at a given subcritical temperature (e.g., the summed temperature $T_{GC}+T_{SC,fixed}$). Controller 50 can then set the high side pressure setpoint $P_{sp}$ equal to the calculated saturation pressure $P_{sat}$ and operate high pressure valve 4 to drive the high side pressure $P_{high}$ to the pressure setpoint $P_{sp}$.

If the high side pressure $P_{high}$ of the $CO_2$ refrigerant exiting heat exchanger 2 is greater than the critical pressure $P_{crit}$ (i.e., $P_{high}>P_{crit}$), controller 50 can determine that the $CO_2$ refrigerant is in a supercritical region. In other implementations, if the temperature $T_{GC}$ of the $CO_2$ refrigerant exiting heat exchanger 2 is greater than the critical temperature $T_{crit}$ (i.e., $T_{GC}>T_{crit}$), controller 50 can determine that the $CO_2$ refrigerant is in a supercritical region. In response to determining that the $CO_2$ refrigerant is in a supercritical region, controller 50 can identify a dynamic pseudo-subcooling value $T_{SC,dynamic}$ that corresponds the measured temperature $T_{GC}$. The dynamic pseudo-subcooling value $T_{SC,dynamic}$ can vary as a function of the measured temperature $T_{GC}$. For example, the value of $T_{SC,dynamic}$ can decrease with increasing $T_{GC}$. Controller 50 can add the dynamic pseudo-subcooling value $T_{SC,dynamic}$ to the measured temperature $T_{GC}$ and identify a corresponding pseudo-saturation pressure $P^*_{sat}(T_{GC}+T_{SC,dynamic})$, where the function $P^*_{sat}(\ )$ defines the pseudo-saturation pressure $P^*_{sat}$ of the $CO_2$ refrigerant at a given supercritical temperature (e.g., the summed temperature $T_{GC}+T_{SC,dynamic}$). A pressure offset $\Delta P$ can be used to provide additional subcooling. The pressure offset $\Delta P$ can be based, for example, on a maximum operating pressure of the $CO_2$ refrigeration system. The pseudo-saturation pressure $P^*_{sat}$ for supercritical temperatures, the function $P^*_{sat}(\ )$, and the pressure offset $\Delta P$ are described in greater detail below. Controller 50 can then set the high side pressure setpoint $P_{sp}$ equal to the calculated pseudo-saturation pressure $P^*_{sat}+\Delta P$ and operate high pressure valve 4 to drive the high side pressure $P_{high}$ to the pressure setpoint $P_{sp}$.

In some implementations, controller 50 is configured to operate gas bypass valve 8 and/or parallel compressor 26 to maintain the $CO_2$ pressure within receiver 6 at a desired setpoint or within a desired range. In some implementations, controller 50 operates gas bypass valve 8 and parallel compressor 26 based on a flow rate (e.g., mass flow, volume flow, etc.) of $CO_2$ refrigerant through gas bypass valve 8. Controller 50 can use a valve position of gas bypass valve 8 as a proxy for $CO_2$ refrigerant flow rate. In some implementations, controller 50 operates high pressure valve 4 and expansion valves 11 and 21 to regulate the flow of refrigerant in system 100.

Controller 50 can include feedback control functionality for adaptively operating the various components of $CO_2$ refrigeration system 100. For example, controller 50 can receive or generate a setpoint (e.g., a temperature setpoint, a pressure setpoint, a flow rate setpoint, a power usage setpoint, etc.) and operate one or more components of system 100 to achieve the setpoint. The setpoint can be specified by a user (e.g., via a user input device, a graphical user interface, a local interface, a remote interface, etc.) or automatically determined by controller 50 based on one or more measurements collected by the sensors of $CO_2$ refrigeration system 100.

Controller 50 can be a proportional-integral (PI) controller, a proportional-integral-derivative (PID) controller, a pattern recognition adaptive controller (PRAC), a model recognition adaptive controller (MRAC), a model predictive controller (MPC), or any other type of controller employing any type of control functionality. In some implementations, controller 50 is a local controller for $CO_2$ refrigeration system 100. In other implementations, controller 50 is a supervisory controller for a plurality of controlled subsystems (e.g., a refrigeration system, an AC system, a lighting system, a security system, etc.). For example, controller 50 can be a controller for a comprehensive building management system incorporating $CO_2$ refrigeration system 100. Controller 50 can be implemented locally, remotely, or as part of a cloud-hosted suite of building management applications.

Still referring to FIG. 2, controller 50 is shown to include a communications interface 54 and a processing circuit 51. Communications interface 54 can be or include wired or wireless interfaces (e.g., jacks, antennas, transmitters, receivers, transceivers, wire terminals, etc.) for conducting electronic data communications. For example, communications interface 54 can be used to conduct communications with gas bypass valve 8, parallel compressor 26, compressors 14 and 24, high pressure valve 4, various data acquisition devices within $CO_2$ refrigeration system 100 (e.g., temperature sensors, pressure sensors, flow sensors, etc.) and/or other external devices or data sources. Data communications can be conducted via a direct connection (e.g., a wired connection, an ad-hoc wireless connection, etc.) or a network connection (e.g., an Internet connection, a LAN, WAN, or WLAN connection, etc.). For example, communications interface 54 can include an Ethernet card and port for sending and receiving data via an Ethernet-based communications link or network. In another example, communications interface 54 can include a Wi-Fi transceiver or a cellular or mobile phone transceiver for communicating via a wireless communications network.

In some implementations, communications interface 54 receives a measurement of a heat exchanger exit temperature $T_{GC}$ from temperature sensor 33 and a measurement of the high side pressure $P_{high}$ from pressure sensor 34. The heat exchanger exit temperature $T_{GC}$ can indicate the temperature of the $CO_2$ refrigerant at the outlet of heat exchanger 2, whereas the high side pressure $P_{high}$ can indicate the pressure of the $CO_2$ refrigerant at the outlet of heat exchanger 2. If the cooling/condensation of the $CO_2$ refrigerant within heat exchanger 2 is isobaric, the high side pressure $P_{high}$ can also be the pressure of the $CO_2$ refrigerant within the high side components of $CO_2$ refrigeration system 100 (e.g., fluid conduit 1, heat exchanger 2, and/or fluid conduit 3). Communications interface 54 can also receive a valve position signal from high pressure valve 4. Communications interface 54 can provide control signals to high pressure valve 4 (e.g., to an electromechanical actuator that operates high pressure valve 4) to drive the high side pressure $P_{high}$ of the $CO_2$ refrigerant to a high side pressure setpoint.

Processing circuit 51 is shown to include a processor 52 and memory 53. Processor 52 can be implemented as a general purpose processor, an application specific integrated circuit (ASIC), one or more field programmable gate arrays (FPGAs), a group of processing components, a microcontroller, or other suitable electronic processing components. Memory 53 (e.g., memory device, memory unit, storage device, etc.) can be one or more devices (e.g., RAM, ROM, solid state memory, hard disk storage, etc.) for storing data and/or computer code for completing or facilitating the various processes, layers and modules described in the present application. Memory 53 can be or include volatile memory or non-volatile memory. Memory 53 can include database components, object code components, script components, or any other type of information structure for supporting the various activities and information structures described in the present application. According to an exemplary embodiment, memory 53 is communicably connected to processor 52 via processing circuit 51 and includes computer code for executing (e.g., by processing circuit 51 and/or processor 52) one or more processes or control features described herein.

Still referring to FIG. 2, controller 50 is shown to include a criticality detector 55. Criticality detector 55 can be configured to determine whether the $CO_2$ refrigerant leaving heat exchanger 2 is in a subcritical region or supercritical region. In some implementations, criticality detector 55 can receive the measured pressure $P_{high}$ of the $CO_2$ refrigerant exiting heat exchanger 2 and can compare the measured pressure $P_{high}$ with the critical pressure $P_{crit}$ of the $CO_2$ refrigerant. The critical pressure $P_{crit}$ is a known constant and can be stored as a fixed value within memory 53. If the pressure $P_{high}$ of the $CO_2$ refrigerant exiting heat exchanger 2 is less than the critical pressure $P_{crit}$ (i.e., $P_{high}<P_{crit}$), criticality detector 55 can determine that the $CO_2$ refrigerant is in a subcritical region. However, if the pressure $P_{high}$ of the $CO_2$ refrigerant exiting heat exchanger 2 is greater than the critical pressure $P_{crit}$ (i.e., $P_{high}>P_{crit}$), criticality detector 55 can determine that the $CO_2$ refrigerant is in a supercritical region.

In other implementations, criticality detector 55 can receive the measured temperature $T_{GC}$ of the $CO_2$ refrigerant exiting heat exchanger 2 and can compare the measured temperature $T_{GC}$ with the critical temperature $T_{crit}$ of the $CO_2$ refrigerant. The critical temperature $T_{crit}$ is a known constant and can be stored as a fixed value within memory 53. If the temperature $T_{GC}$ of the $CO_2$ refrigerant exiting heat exchanger 2 is less than the critical temperature $T_{crit}$ (i.e., $T_{GC}<T_{crit}$), criticality detector 55 can determine that the $CO_2$ refrigerant is in a subcritical region. However, if the temperature $T_{GC}$ of the $CO_2$ refrigerant exiting heat exchanger 2 is greater than the critical temperature $T_{crit}$ (i.e., $T_{GC}>T_{crit}$), criticality detector 55 can determine that the $CO_2$ refrigerant is in a supercritical region.

In response to determining that the $CO_2$ refrigerant is in a subcritical region, criticality detector 55 can trigger subcooling value generator 56 and saturation pressure calculator 58 to generate the pressure setpoint $P_{sp}$. Subcooling value generator 56 can identify a predetermined or fixed subcooling value $T_{SC,fixed}$ and can provide the fixed subcooling value $T_{SC,fixed}$ to saturation pressure calculator 58. The fixed subcooling value $T_{SC,fixed}$ can be stored in memory 53, specified by a user, and/or received from an external data source.

Saturation pressure calculator 58 can add the fixed subcooling value $T_{SC,fixed}$ to the measured temperature $T_{GC}$ and can identify a saturation pressure $P_{sat}$ that corresponds to the summed temperature $T_{GC}+T_{SC,fixed}$. In some implementations, saturation pressure calculator 58 uses a function $P_{sat}(T_{GC}+T_{SC,fixed})$ to calculate the saturation pressure $P_{sat}$ as a function of the summed temperature $T_{GC}+T_{SC,fixed}$. The function $P_{sat}( )$ can define the saturation pressure $P_{sat}$ of the $CO_2$ refrigerant as a function of temperature. In other implementations, saturation pressure calculator 58 uses a lookup table that defines pairs of saturation pressures and corresponding saturation temperatures of the $CO_2$ refrigerant and interpolates within the lookup table to calculate the saturation pressure $P_{sat}$ as a function of the summed temperature $T_{GC}+T_{SC,fixed}$.

Saturation pressure calculator 58 can then set the high side pressure setpoint $P_{sp}$ equal to the calculated saturation pressure $P_{sat}$. By setting the high side pressure setpoint $P_{sp}$ equal to the calculated saturation pressure $P_{sat}$, saturation pressure calculator 58 ensures that the $CO_2$ refrigerant has the desired amount of subcooling (e.g., $T_{SC,fixed}$) at the exit of heat exchanger 2. For example, the saturation temperature of the $CO_2$ refrigerant at the calculated saturation pressure $P_{sat}$ is equal to the summed temperature $T_{GC}+T_{SC,fixed}$. Because the actual temperature of the $CO_2$ refrigerant at the exit of heat exchanger 2 is $T_{GC}$, the difference between the actual temperature and the saturation temperature is $T_{SC,fixed}$. In other words, the $CO_2$ refrigerant is subcooled by the desired amount $T_{SC,fixed}$.

In response to determining that the $CO_2$ refrigerant is in a supercritical region, criticality detector 55 can trigger pseudo-subcooling value generator 57 and pseudo-saturation pressure calculator 59 to generate the pressure setpoint $P_{sp}$. Pseudo-subcooling value generator 57 can identify a dynamic pseudo-subcooling value $T_{SC,dynamic}$ that corresponds the measured temperature $T_{GC}$. The dynamic pseudo-subcooling value $T_{SC,dynamic}$ can vary as a function of the measured temperature $T_{GC}$. In some implementations, the dynamic pseudo-subcooling value $T_{SC,dynamic}$ is relatively smaller at higher values of the measured temperature $T_{GC}$ and relatively larger at lower values of the measured temperature $T_{GC}$. The function that defines the dynamic pseudo-subcooling values $T_{SC,dynamic}$ as a function of the measured temperature $T_{GC}$ can be adjusted (e.g., by a user) to control the relationship between the dynamic pseudo-subcooling values $T_{SC,dynamic}$ and the temperature $T_{GC}$. For example, a user can provide input to controller 50 and can adjust whether the dynamic pseudo-subcooling values $T_{SC,dynamic}$ increase, decrease, or remain constant as the measured temperature $T_{GC}$ increases. Pseudo-subcooling value generator 57 can calculate $T_{SC,dynamic}$ as a function of $T_{GC}$ and provide the calculated value of $T_{SC,dynamic}$ to pseudo-saturation pressure calculator 59.

Controller 50 includes a pressure offset factor calculator 68. The pressure offset factor calculator determines a pressure offset factor $\Delta P_{factor}$ to provide additional subcooling. In some implementations, the pressure offset factor $\Delta P_{factor}$ is a fixed value. In some implementations, the pressure offset factor $\Delta P_{factor}$ is user adjustable. In some implementations, the pressure offset factor $\Delta P_{factor}$ is dynamically adjustable by the controller 50. For example, the controller 50 can decrease the pressure offset factor $\Delta P_{factor}$ based on the measured temperature $T_{GC}$ as a percentage of a maximum operating temperature of the $CO_2$ refrigeration system 100. In some implementations, the controller 50 dynamically adjusts the pressure offset factor $\Delta P_{factor}$ when the measured pressure $P_{high}$ is above a pressure offset enable setpoint $\Delta P_{enable}$. The pressure offset enable setpoint $\Delta P_{enable}$ can be a user-specified value. In some implementations, the pressure offset enable setpoint $\Delta P_{enable}$ can be equal to the critical pressure $P_{crit}$ of the refrigerant. In some implementations, the pressure offset enable setpoint $\Delta P_{enable}$ is above the critical pressure $P_{crit}$. In some implementations, the pressure offset enable setpoint $\Delta P_{enable}$ can be based on a percentage of the operating pressure range of the refrigeration system.

Pseudo-saturation pressure calculator 59 can add the dynamic pseudo-subcooling value $T_{SC,dynamic}$ to the measured temperature $T_{GC}$ and can identify a pseudo-saturation pressure $P^*_{sat}$ that corresponds to the target temperature $T=T_{GC}+T_{SC,dynamic}$. In some implementations, pseudo-saturation pressure calculator 59 uses a function $P^*_{sat}(T_{GC}+T_{SC,dynamic})$ to calculate the pseudo-saturation pressure $P^*_{sat}$ as a function of the target temperature $T=T_{GC}+T_{SC,dynamic}$ The function $P^*_{sat}(\ )$ can define the pseudo-saturation pressure $P^*_{sat}$ of the $CO_2$ refrigerant as a function of temperature. In other implementations, pseudo-saturation pressure calculator 59 uses a lookup table that defines pairs of pseudo-saturation pressures and corresponding supercritical temperatures of the $CO_2$ refrigerant and interpolates within the lookup table to calculate the pseudo-saturation pressure $P^*_{sat}$ as a function of the target temperature $T=T_{GC}+T_{SC,dynamic}$ The pseudo-saturation pressure $P^*_{sat}$ for supercritical temperatures and the function $P^*_{sat}(\ )$ are described in greater detail in reference to FIG. 3.

Pseudo-saturation pressure calculator 59 can determine a pressure offset $\Delta P$ to provide additional pseudo-subcooling of the $CO_2$ refrigerant. The pseudo-saturation pressure calculator 59 receives a pressure offset factor $\Delta P_{factor}$ and a pressure offset enable setpoint $\Delta P_{enable}$ from the pressure offset factor calculator 68. The pressure offset $\Delta P$ can be based on the target temperature T, a maximum operating pressure $P_{max}$ of the $CO_2$ refrigeration system, and the pressure offset factor $\Delta P_{factor}$ The pressure offset $\Delta P$ is described in greater detail in reference to FIG. 3.

Pseudo-saturation pressure calculator 59 can then set the high side pressure setpoint $P_{sp}$ based on the determined pseudo-saturation pressure $P^*_{sat}$ and the determined pressure offset $\Delta P$. By setting the high side pressure setpoint $P_{sp}$ based on the calculated pseudo-saturation pressure $P^*_{sat}$ and pressure offset $\Delta P$, pseudo-saturation pressure calculator 59 provides settings for the $CO_2$ refrigerant to have the desired amount of pseudo-subcooling at the exit of heat exchanger 2.

Still referring to FIG. 2, controller 50 is shown to include a valve controller 60. Valve controller 60 can receive the pressure setpoint $P_{sp}$ from saturation pressure calculator 58 or pseudo-saturation pressure calculator 59, depending on whether the $CO_2$ refrigerant is in a subcritical region or supercritical region exiting heat exchanger 2. Valve controller 60 can also receive the high side pressure $P_{high}$ measured by pressure sensor 34. Valve controller 60 can operate high pressure valve 4 using any of a variety of feedback control techniques (e.g., PID, PI, MPC, etc.) to drive the measured high side pressure $P_{high}$ to the pressure setpoint $P_{sp}$. For example, valve controller 60 is shown providing control signals to high pressure valve 4. The control signals can cause high pressure valve 4 to variably open or close to adjust the flowrate of the $CO_2$ refrigerant through high pressure valve 4, thereby affecting the high side pressure $P_{high}$ upstream of high pressure valve 4. In some implementations, valve controller 60 causes high pressure valve 4 to open more to decrease the high side pressure $P_{high}$ (e.g., if the high side pressure $P_{high}$ is greater than the pressure setpoint $P_{sp}$) and causes high pressure valve 4 to close more to increase the high side pressure $P_{high}$ (e.g., if the high side pressure $P_{high}$ is less than the pressure setpoint $P_{sp}$).

Figure 3:
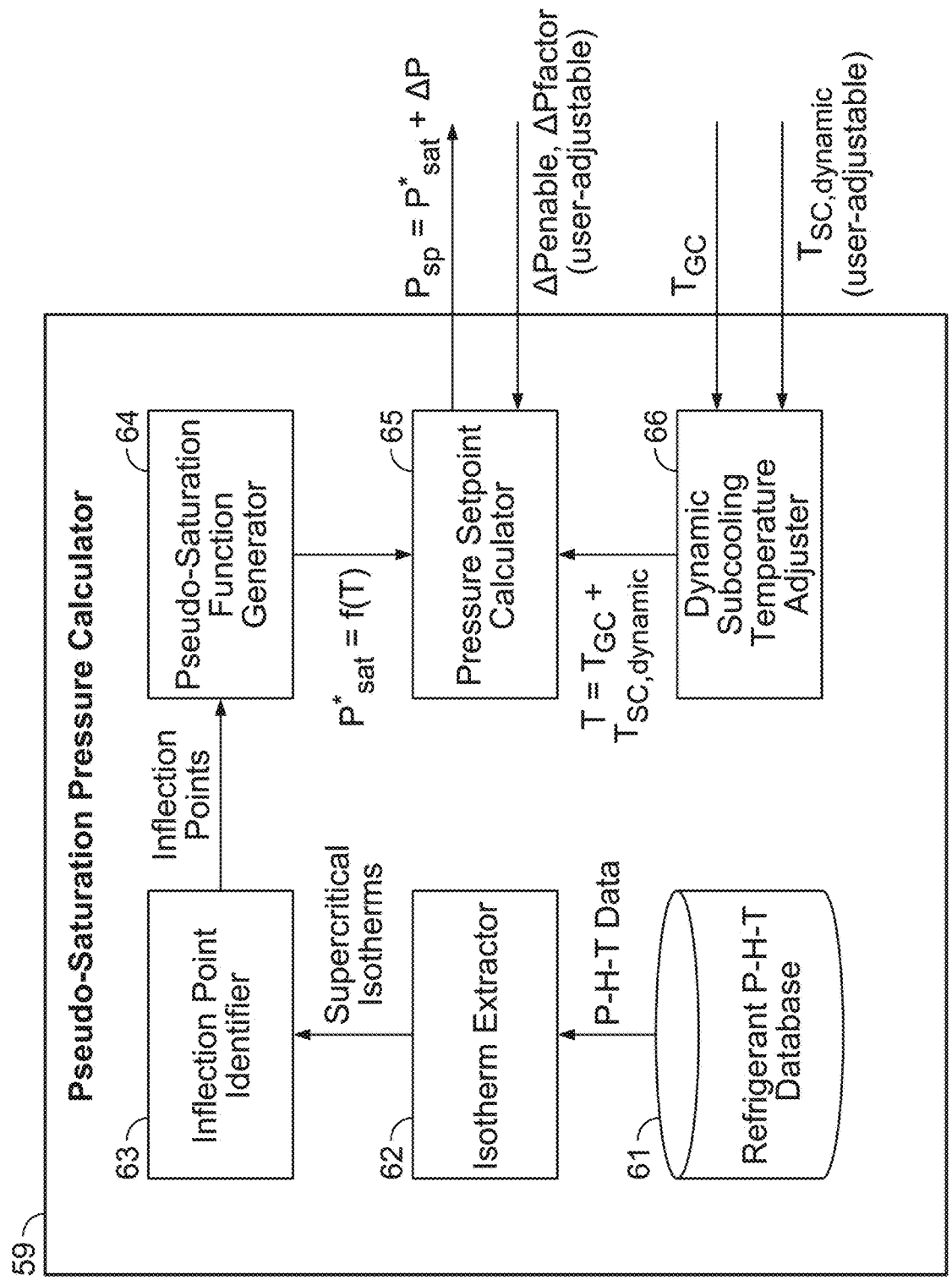
FIG. 3 is a block diagram illustrating an example pseudo-saturation pressure calculator component of the controller of FIG. 2 in greater detail.

FIG. 3 is a block diagram illustrating example pseudo-saturation pressure calculator 59 in greater detail. As described above, pseudo-saturation pressure calculator 59 can be configured to calculate a pseudo-saturation pressure $P^*_{sat}$ of the $CO_2$ refrigerant at various supercritical temperatures. When the measured pressure of the $CO_2$ refrigerant $P_{high}$ exceeds the supercritical pressure $P_{crit}$ and/or the measured temperature of the $CO_2$ refrigerant $T_{GC}$ exceeds the supercritical temperature $T_{crit}$, pseudo-saturation pressure calculator 59 can determine the pressure setpoint $P_{sp}$ to add the desired amount of pseudo-subcooling to the $CO_2$ refrigerant discharging from heat exchanger 2. The pressure setpoint $P_{sp}$ can be based on a determined pressure offset $\Delta P$ and a pseudo-saturated pressure determined based on a pseudo-subcooling value $T_{SC,dynamic}$ and the measured temperature $T_{GC}$. The components of pseudo-saturation pressure calculator 59 and steps performed by pseudo-saturation pressure calculator 59 to calculate the pseudo-saturation pressure $P^*_{sat}$, pressure offset $\Delta P$, and pressure setpoint $P_{sp}$ are described in detail below.

Pseudo-saturation pressure calculator 59 is shown to include a refrigerant pressure (P), enthalpy (H), and temperature (T) database 61. P-H-T database 61 can store data defining various potential states of the $CO_2$ refrigerant. Each potential state of the $CO_2$ refrigerant can have a corresponding pressure value, a corresponding enthalpy value, and a corresponding temperature value. In other words, P-H-T database 61 can store various P-H-T data points for the $CO_2$ refrigerant. The P-H-T data points can be based on known properties and chemical characteristics of the $CO_2$ refrigerant and can be received from an external data source. In some implementations, the pseudo-saturation pressure calculator 59 includes a set of polynomials used to determine P-H-T values based on either a pressure or temperature and the state of the $CO_2$ (e.g., subcritical or supercritical).

Figure 4:
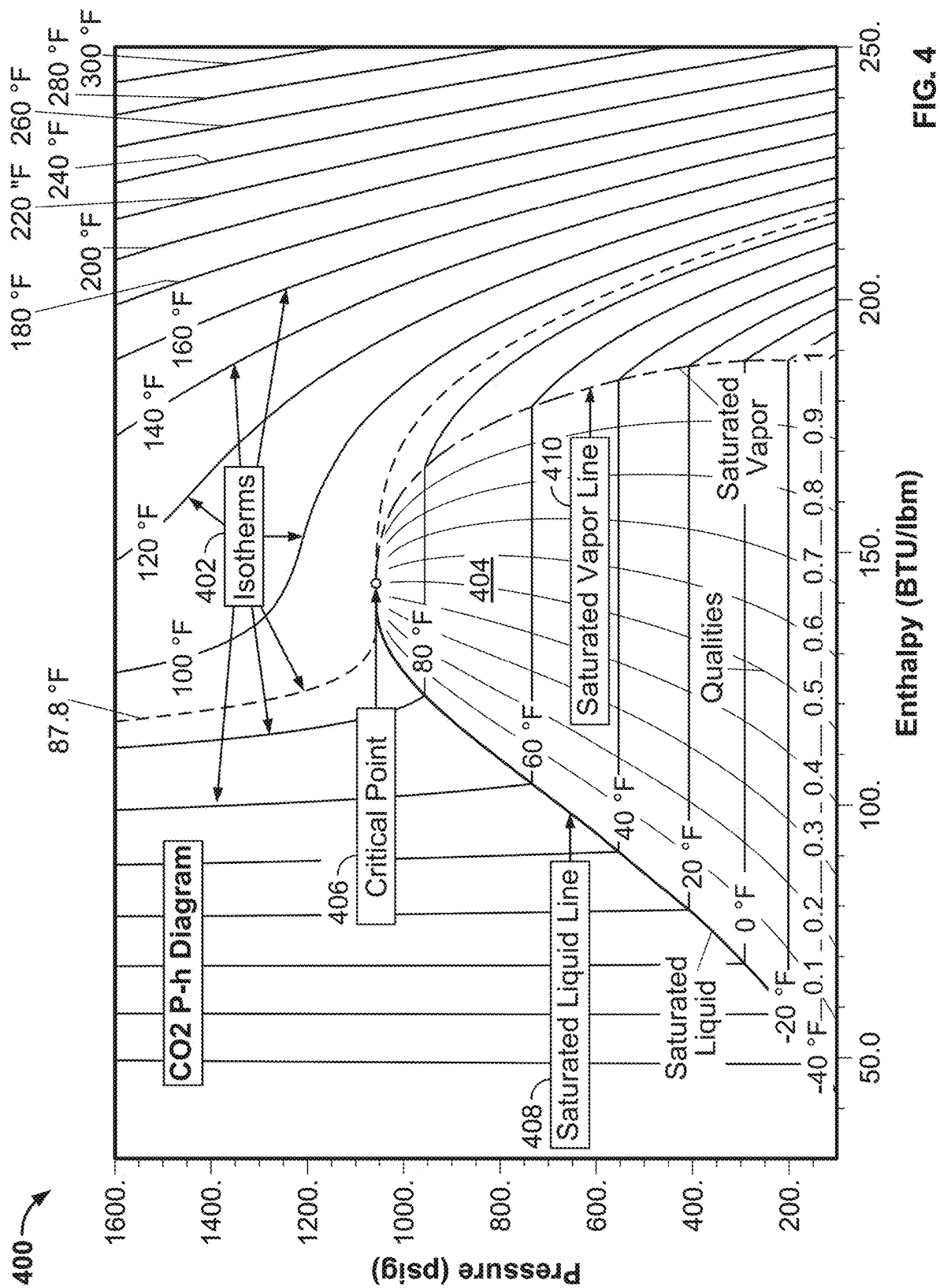
FIG. 4 is an example pressure-enthalpy (P-H) diagram illustrating a set of pressure, enthalpy, and temperature (P-H-T) data that describes various potential states of a $CO_2$ refrigerant.

The data stored in P-H-T database 61 can be represented graphically as shown in FIG. 4. FIG. 4 is a pressure-enthalpy (P-H) diagram 400 of the $CO_2$ refrigerant. In P-H diagram 400, pressure is shown along the vertical axis, whereas enthalpy is shown along the horizontal axis. Isotherms 402 are curves of constant temperature that increase in value from left to right. Isotherms 402 having a temperature and pressure above the critical temperature $T_{crit}$ and critical pressure $P_{crit}$ defined by critical point 406 (e.g., supercritical isotherms) represent the supercritical region of the $CO_2$ refrigerant, whereas isotherms 402 having a temperature below the critical temperature $T_{crit}$ and/or a pressure below the critical pressure $P_{crit}$ (e.g., subcritical isotherms) represent the subcritical region of the $CO_2$ refrigerant. Subcritical isotherms 402 are somewhat parallel to the vertical axis in the liquid region to the left of saturated liquid line 408, exactly parallel to the horizontal axis in the two-phase region within vapor dome 404 (meaning there is no change in pressure as enthalpy increases within vapor dome 404) and have a semi-steep negative slope in the gas region to the right of saturated vapor line 410.

In the subcritical region of P-H diagram 400, the $CO_2$ refrigerant can exhibit well-defined and widely accepted saturated temperatures and pressures where evaporation and condensation processes can occur. The saturated temperatures and pressures are shown as horizontal lines within vapor dome 404 between saturated liquid line 408 and saturated vapor line 410. However, the $CO_2$ refrigerant may not always be confined to saturated states within a vapor compression cycle; subcooled liquid or superheated gas states are common in vapor compression cycles. The subcooling of a liquid occurs when the refrigerant's pressure is greater than its saturation pressure at a given temperature. Conversely, a gas exists in a superheated state when the pressure of the refrigerant is less than its saturation pressure at a given subcritical temperature (e.g., when the temperature of the gas is below $T_{crit}$) or less than its critical pressure $P_{crit}$ at a given supercritical temperature (e.g., when the temperature of the gas is above $T_{crit}$). The portions of subcritical isotherms 402 to the left of saturated liquid line 408 represent the $CO_2$ refrigerant in a subcooled state, whereas the portions of subcritical isotherms 402 to the right of saturated vapor line 410 represent the $CO_2$ refrigerant in a superheated state. This notion of manipulating a refrigerant's pressure at a given temperature to achieve subcooling or superheat can be used in commercial refrigeration controls.

To move forward in this discussion, an understanding of the difference between a vapor and a gas is important. Vapor is characterized by a gas state which, during an isothermal process (maintaining constant temperature), can condense by increasing its pressure. For the $CO_2$ refrigerant, this can occur if the temperature of the $CO_2$ refrigerant gas is less than the critical temperature $T_{crit}$ of the $CO_2$ refrigerant. If the temperature of the $CO_2$ refrigerant gas is greater than the critical temperature $T_{crit}$ of the $CO_2$ refrigerant and the pressure of the $CO_2$ refrigerant is increased isothermally, the $CO_2$ refrigerant gas will never condense into the liquid state. Therefore, a superheated gas that cannot condense is not a vapor and has no corresponding saturation pressure.

Referring again to FIG. 3, pseudo-saturation pressure calculator 59 is shown to include an isotherm extractor 62 and an inflection point identifier 63. Isotherm extractor 62 can identify the supercritical isotherms of the $CO_2$ refrigerant using the P-H-T data stored in P-H-T database 61. Each supercritical isotherm can be defined by a set of P-H-T data points that have the same supercritical temperature. In some implementations, isotherm extractor 62 generates pressure-enthalpy functions that represent the supercritical isotherms. For example, each supercritical isotherm 402 can be represented by a function that defines pressure as a function of enthalpy (i.e., $P=f(H)$). In some implementations, isotherm extractor 62 uses a regression process to fit a curve (e.g., a cubic polynomial) to the set of P-H-T points that define each supercritical isotherm.

Inflection point identifier 63 can receive the supercritical isotherms from isotherm extractor 62. Inflection point identifier 63 can be configured to identify the inflection point of each supercritical isotherm. The inflection point of a supercritical isotherm can be defined as the point at which the change in pressure per unit enthalpy along the supercritical isotherm reaches a minimum. In other words, the inflection point of a supercritical isotherm is the point at which the slope of the supercritical isotherm is closest to zero. These inflection points are shown graphically in FIG. 5A as isotherm inflection points 508.

FIG. 5A shows another pressure-enthalpy (P-H) diagram 500 representing the P-H-T data for the $CO_2$ refrigerant. P-H diagram 500 is shown to include several isotherms 502. Some of isotherms 502 have a temperature less than the critical temperature $T_{crit}$ (defined by critical point 506), pass through vapor dome 504, and are therefore subcritical isotherms 502. Other isotherms 502 have a temperature above $T_{crit}$, do not pass through vapor dome 504, and are therefore supercritical isotherms 502. Isotherm inflection points represent the points along each supercritical isotherm 502 at which the slope of the supercritical isotherm 502 is closest to zero.

Inflection point identifier 63 can identify the inflection point 508 of each supercritical isotherm 502 using an analytical or numerical technique. For example, inflection point identifier 63 can use a pressure-enthalpy function that defines a supercritical isotherm 502 (e.g., $P=f(H)$) to calculate the slope of the supercritical isotherm 502 as a function of enthalpy value, (e.g., $dP/dH=f(H)$).

Inflection point identifier 63 can then identify the enthalpy value H at which the slope dP/dH is closest to zero and can select the corresponding P-H-T data point as the inflection point 508 of the supercritical isotherm 502. In some implementations, the inflection point identifier 63 determines the enthalpy value H at which the slope dP/dH is closest to zero using a set of polynomials that define the P-H-T relationship based on a temperature and the $CO_2$ being in a supercritical state.

As another example, inflection point identifier 63 can use the set of P-H-T data that defines a supercritical isotherm 502 to calculate changes in pressure and changes in enthalpy between each pair of adjacent P-H-T data points. Inflection point identifier 63 can then identify the pair of P-H-T data points for which the value of the change in pressure divided by the change in enthalpy is closest to zero. Inflection point identifier 63 can select either P-H-T data point in the identified pair as the inflection point 508 or can interpolate between the identified pair of P-H-T data points to calculate the inflection point 508 (e.g., an average of the P-H-T data points in the pair). Inflection point identifier 63 can repeat this process for each supercritical isotherm 502 to identify the corresponding inflection point 508.

Referring again to FIG. 3, pseudo-saturation pressure calculator 59 is shown to include a pseudo-saturation function generator 64. Pseudo-saturation function generator 64 can receive the inflection points 508 from inflection point identifier 63. Each inflection point 508 can include a pressure value, an enthalpy value, and a temperature value. Pseudo-saturation function generator 64 can use the temperature values and pressure values of the inflection points 508 to fit a two-dimensional line to the inflection points 508, shown in FIG. 5A as pseudo-saturated line 510. Pseudo-saturated line 510 can be generated by fitting a line to inflection points 508 using any of a variety of curve fitting techniques (e.g., polynomial regression). In some implementations, pseudo-saturated line 510 can be a linear (i.e., straight) line that best fits inflection points 508. In other implementations, pseudo-saturated line 510 can be quadratic, cubic, or any other polynomial order. Pseudo-saturated line 510 can pass through all of inflection points 508 or can be a line that best fits inflection points 508.

Pseudo-saturated line 510 can define a relationship between temperature and pseudo-saturation pressure $P^*_{sat}$ for various supercritical states of the $CO_2$ refrigerant. In some implementations, pseudo-saturation function generator 64 generates a function that defines pseudo-saturated line 510 (e.g., a pseudo-saturation function). The pseudo-saturation function can define a pseudo-saturation pressure $P^*_{sat}$ as a function of a supercritical temperature of the $CO_2$ refrigerant (e.g., $P^*_{sat}=f(T)$). The pseudo-saturation function can be an equation that represents pseudo-saturated line 510 and can define the points along pseudo-saturated line 510. In other words, each point along pseudo-saturated line 510 can be a solution to the pseudo-saturation function $P^*_{sat}=f(T)$. The pseudo-saturation function $P^*_{sat}=f(T)$ can be generated by fitting a polynomial function (e.g., a linear function, a quadratic function, a cubic function, etc.) to inflection points 508, as previously described.

Figure 5B:
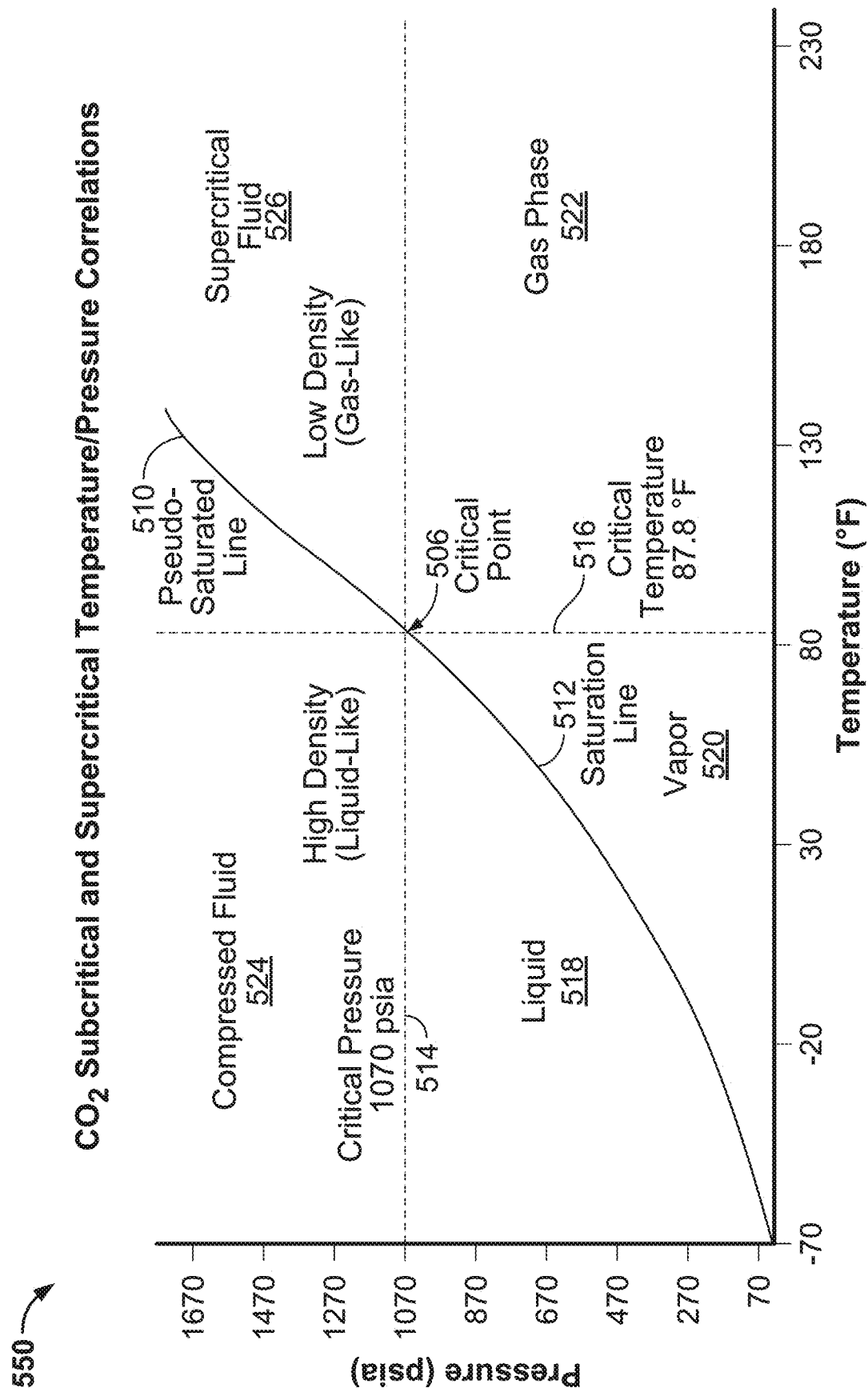
FIG. 5B is an example pressure-temperature (P-T) diagram showing a subcritical saturation line and supercritical pseudo-saturated line of the $CO_2$ refrigerant.

FIG. 5B shows a pressure-temperature graph 550 representing the pressure and temperature data (e.g., a subset of the P-H-T data) for the $CO_2$ refrigerant. In graph 550, line 514 represents the critical pressure $P_{crit}$ of the $CO_2$ refrigerant (i.e., 1070 pisa) whereas line 516 represents the critical temperature $T_{crit}$ of the $CO_2$ refrigerant (i.e., 87.8° F.). The intersection of lines 514 and 516 defines the critical point 506.

When both the temperature of the $CO_2$ refrigerant is below the critical temperature $T_{crit}$ and the pressure of the $CO_2$ refrigerant is below the critical pressure $P_{crit}$, the $CO_2$ refrigerant can exist as a liquid (within liquid region 518), a vapor (within vapor region 520), or as a liquid-vapor mixture (along saturation line 512). When the temperature of the $CO_2$ refrigerant is above the critical temperature $T_{crit}$ and the pressure of the $CO_2$ refrigerant is below the critical pressure $P_{crit}$, the $CO_2$ refrigerant is a gas (within gas region 522). When the temperature of the $CO_2$ refrigerant is below the critical temperature $T_{crit}$ and the pressure of the $CO_2$ refrigerant is above the critical pressure $P_{crit}$, the $CO_2$ refrigerant is a high density (liquid-like) compressed fluid (within compressed fluid region 524). When both the temperature of the $CO_2$ refrigerant is above the critical temperature $T_{crit}$ and the pressure of the $CO_2$ refrigerant is above the critical pressure $P_{crit}$, the $CO_2$ refrigerant is a low density (e.g., gas-like) supercritical fluid (within supercritical fluid region 526).

In graph 550, vapor dome 504 (shown in FIG. 5A) is collapsed into a single saturation line 512. Saturation line 512 defines the boundary of vapor dome 504 for subcritical states of the $CO_2$ refrigerant and terminates at critical point 506 (at the top of vapor dome 504). In some implementations, pseudo-saturated line 510 is continuous with saturation line 512 and extends from critical point 506 into supercritical fluid region 526. Accordingly, pseudo-saturated line 510 can be thought of as the extension of saturation line 512 into supercritical fluid region 526.

Referring again to FIG. 3, pseudo-saturation pressure calculator 59 is shown to include a dynamic subcooling temperature adjuster 66 and a pressure setpoint calculator 65. Dynamic subcooling temperature adjuster 66 can receive the temperature $T_{GC}$ of the $CO_2$ refrigerant measured by temperature sensor 33 and the dynamic pseudo-subcooling value $T_{SC,dynamic}$ generated by pseudo-subcooling value generator 57. Dynamic subcooling temperature adjuster 66 can add the temperature $T_{GC}$ to the dynamic pseudo-subcooling value $T_{SC,dynamic}$ to calculate a target temperature T (e.g., $T=T_{GC}+T_{SC,dynamic}$) and can provide the calculated temperature T to pressure setpoint calculator 65.

Pressure setpoint calculator 65 can receive the pseudo-saturation function $P^*_{sat}=f(T)$ from pseudo-saturation function generator 64 and the calculated temperature T from dynamic subcooling temperature adjuster 66. Pressure setpoint calculator 65 can apply the calculated temperature T as an input to the pseudo-saturation function $P^*_{sat}=f(T)$ to calculate a corresponding pseudo-saturation pressure $P^*_{sat}$. The calculated pseudo-saturation pressure $P^*_{sat}$ can be a point along pseudo-saturated line 510 that has the calculated temperature T.

Pressure setpoint calculator 65 can determine a pressure offset $\Delta P$. The pressure offset $\Delta P$ can provide additional pseudo-subcooling of the $CO_2$ refrigerant by raising the pressure setpoint $P_{sp}$ above the pseudo-saturated pressure $P^*_{sat}$. Pressure setpoint calculator 65 can receive a pressure offset factor $\Delta P_{factor}$ from the pressure offset factor calculator 68 that affects the magnitude of the pressure offset $\Delta P$. The pressure setpoint calculator 65 determines a maximum pseudo-saturated temperature $T_{max}$ based on a maximum operating pressure $P_{max}$ of the $CO_2$ refrigeration system. For example, the pressure setpoint calculator 65 can invert the pseudo-saturation function $P^*_{sat}=f(T)$ to determine the maximum pseudo-saturated temperature $T_{max}$. In some implementations, the pressure setpoint calculator 65 can use a lookup table to determine the maximum pseudo-saturated temperature $T_{max}$ based on the maximum operating pressure $P_{max}$.

An equivalent maximum temperature $T_{max,eq}$ can be determined based on the value of the pressure offset factor $\Delta P_{factor}$. The equivalent maximum temperature $T_{max,eq}$ represents, for example, a temperature at which the $CO_2$ refrigeration system can reach the maximum operating pressure $P_{max}$ while using pseudo-subcooling. A larger value of $\Delta P_{factor}$ can result in a lower value of $T_{max,eq}$, and a smaller value of $\Delta P_{factor}$ can result in a higher value of $T_{max,eq}$. A function is fit between the critical point ($T_{crit}$, $P_{crit}$) and the maximum operating condition ($T_{max}$, $P_{max}$). A second function is fit between the critical point ($T_{crit}$, $P_{crit}$) and the equivalent maximum operating condition ($T_{max,eq}$, $P_{max}$). The functions can be, for example, linear functions or other polynomial function. The pressure offset $\Delta P$ is determined by the difference between the determined pressure of the two functions evaluated at the target temperature ($T=T_{GC}+T_{SC,dynamic}$).

In some implementations, the value of the pressure offset factor $\Delta P_{factor}$ is specified and adjustable by a user. In some implementations, the pressure offset factor $\Delta P_{factor}$ is determined based on a vapor ratio of the refrigerant in the receiver 6. For example, a value of $\Delta P_{factor}$ can be increased to decrease the vapor ratio (e.g., increase the amount of liquid) in the receiver 6. The vapor ratio can also be used to monitor the health of the system (e.g., fan failure or adiabatic pad failure), and the controller can determine operating conditions for system components (e.g., parallel compressor) based on the vapor ratio.

In some implementations, the pressure offset factor $\Delta P_{factor}$ is dynamically adjustable by the controller 50. For example, the magnitude of the pressure offset factor $\Delta P_{factor}$ can be reduced as the measured temperature $T_{GC}$ increases. In some implementations, the pressure setpoint calculator 65 can also receive a dynamic pressure offset enable $\Delta P_{enable}$ representative of a pressure that when exceeded enables dynamic adjustments of the value of the pressure offset factor $\Delta P_{factor}$ by the controller. In some implementations, the pressure offset factor $\Delta P_{factor}$ is reduced based on a percentage of the supercritical temperature range remaining (e.g., $(T_{GC}-T_{crit})/(T_{max}-T_{crit})$).

Pressure setpoint calculator 65 can set the pressure setpoint $P_{sp}$ based on the calculated pseudo-saturation pressure $P^*_{sat}$ and the pressure offset $\Delta P$. The pressure setpoint calculator 65 provides the pressure setpoint $P_{sp}$ to the valve controller 60.

Figure 6:
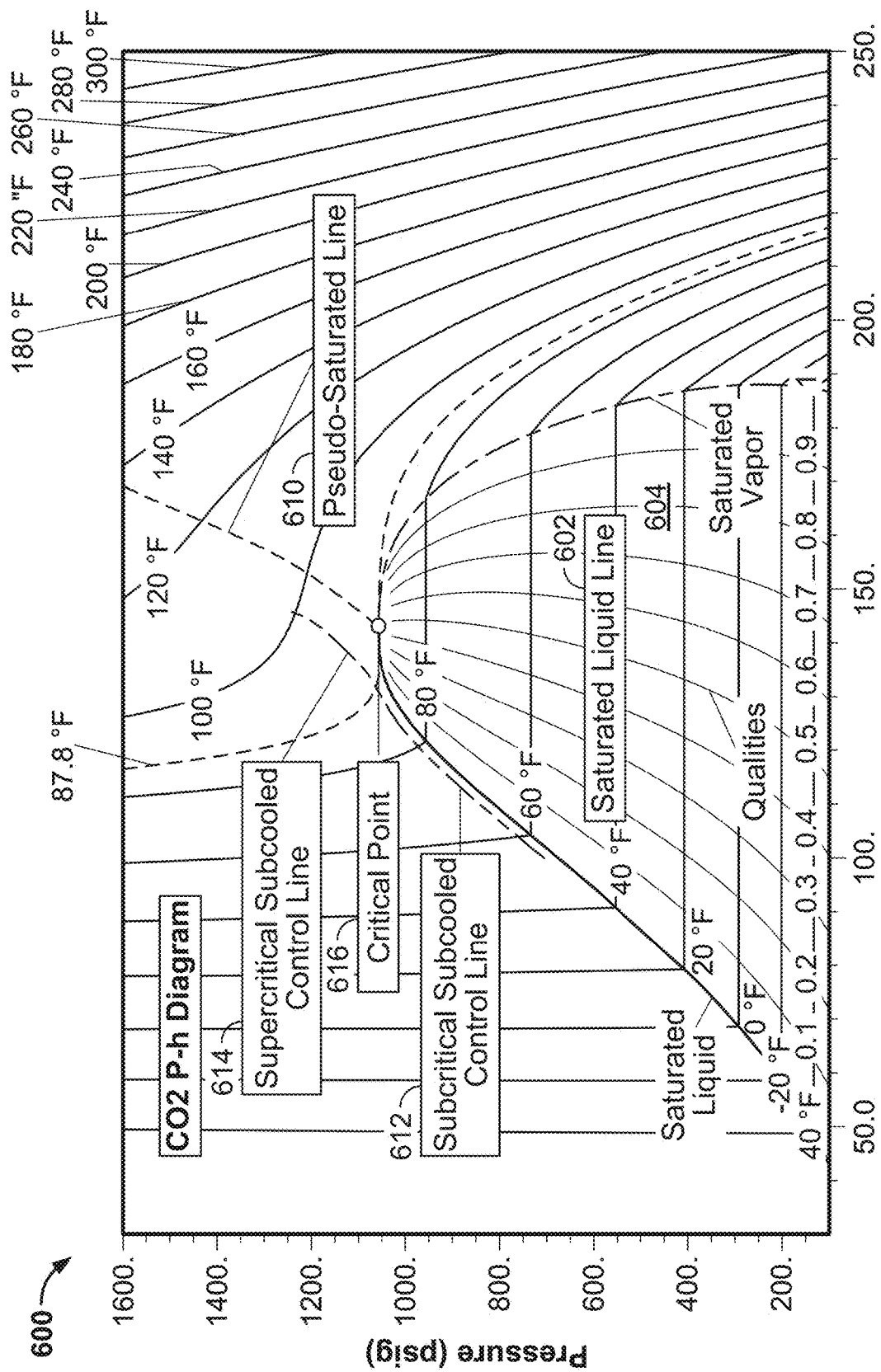
FIG. 6 is an example P-H diagram comparing the states of the $CO_2$ refrigerant when controlled using a subcritical control technique and a supercritical control technique.
Figure 7:
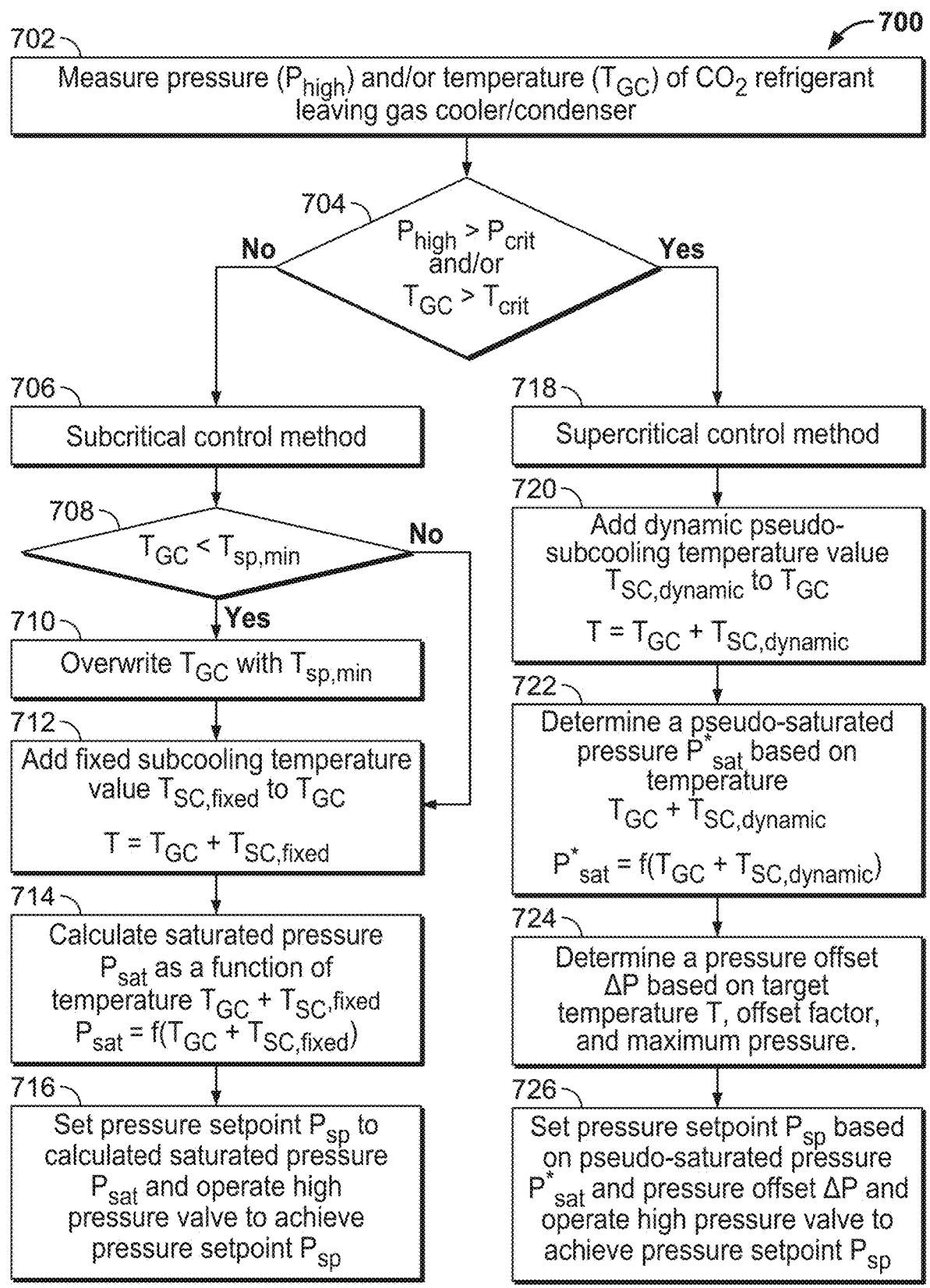
FIG. 7 is a flowchart of an example pressure control process which can be performed by the controller of FIG. 2.

FIGS. 6 and 7 show a pressure-enthalpy (P-H) diagram 600 and a flowchart illustrating an example pressure control process 700 performed by controller 50. The controller measures the pressure $P_{high}$ and/or the temperature $T_{GC}$ of the $CO_2$ refrigerant leaving heat exchanger 2 (step 702). The pressure $P_{high}$ can be measured by a pressure sensor 34 positioned at the exit of heat exchanger 2 or along a fluid conduit 3 coupled to the exit of heat exchanger 2, whereas the temperature $T_{GC}$ can be measured by a temperature sensor 33 positioned at the exit of heat exchanger 2 or along a fluid conduit 3 coupled to the exit of heat exchanger 2, as shown in FIG. 2. The pressure $P_{high}$ and/or temperature $T_{GC}$ measured in step 702 can indicate whether the $CO_2$ refrigerant is in a subcritical region or a supercritical region.

The controller compares the measured pressure $P_{high}$ and/or temperature $T_{GC}$ with the critical pressure $P_{crit}$ and/or temperature $T_{crit}$ of the $CO_2$ refrigerant defined by critical point 616 (step 704). If the measured pressure $P_{high}$ is not greater than the critical pressure $P_{crit}$ and/or the measured temperature $T_{GC}$ is not greater than the critical temperature $T_{crit}$ (e.g., the result of step 704 is "no"), the pressure of the $CO_2$ refrigerant is controlled using a subcritical control method (step 706). Accordingly, a point defining the state of the $CO_2$ refrigerant can be located within vapor dome 604 or along an isotherm that passes through vapor dome 604. However, if the measured pressure $P_{high}$ is greater than the critical pressure $P_{crit}$ and/or the measured temperature $T_{GC}$ is greater than the critical temperature $T_{crit}$ (e.g., the result of step 704 is "yes"), the pressure of the $CO_2$ refrigerant is controlled using a supercritical control method (step 718). Accordingly, a point defining the state of the $CO_2$ refrigerant can be along an isotherm that does not pass through vapor dome 604. In some implementations, the supercritical control method is used when the measured $P_{high}$ is greater than the critical pressure $P_{crit}$, regardless of whether the measured temperature $T_{GC}$ is greater than the critical temperature $T_{crit}$.

The controller compares the measured temperature $T_{GC}$ with a minimum temperature setpoint $T_{sp,min}$ of the $CO_2$ refrigerant (step 708). If the measured temperature $T_{GC}$ is less than the minimum temperature setpoint $T_{sp,min}$ (e.g., the result of step 708 is "yes"), process 700 can include overwriting the measured temperature $T_{GC}$ with the minimum temperature setpoint $T_{sp,min}$ (step 710) and proceeding to step 712. However, if the measured temperature $T_{GC}$ is greater than or equal to than the minimum temperature setpoint $T_{sp,min}$ (e.g., the result of step 708 is "no"), process 700 can proceed directly to step 712 without adjusting the measured temperature $T_{GC}$.

The controller determines a target temperature based on a fixed subcooling temperature value $T_{SC,fixed}$ and the measured temperature $T_{GC}$ (step 712) and calculating a saturated pressure $P_{sat}$ as a function of the summed temperature $T_{GC}+T_{SC,fixed}$ (step 714). The fixed subcooling value $T_{SC,fixed}$ added in step 712 results in a subcritical subcooled control line 612 that is substantially parallel to the saturated liquid line 602 defining the left edge of vapor dome 604. The saturated pressure $P_{sat}$ calculated in step 714 is the saturated pressure corresponding to the summed temperature $T_{GC}+T_{SC,fixed}$. However, because the actual temperature of the $CO_2$ refrigerant is $T_{GC}$ and not $T_{GC}+T_{SC,fixed}$, the state of the $CO_2$ refrigerant will be along subcritical subcooled control line 612 and not saturated liquid line 602 when the pressure of the $CO_2$ refrigerant is controlled to $P_{sat}$.

The controller determines a target pressure (e.g., the pressure setpoint $P_{sp}$) based on the saturated pressure $P_{sat}$ calculated in step 714 and operating high pressure valve 4 to achieve the pressure setpoint (step 716). Accordingly, the temperature of the $CO_2$ refrigerant at the exit of heat exchanger 2 will be $T_{GC}$ and the pressure of the $CO_2$ refrigerant at the exit of heat exchanger 2 will be $P_{sat}(T_{GC}+T_{SC,fixed})$, which places the state of the $CO_2$ refrigerant along subcritical subcooled control line 612.

Returning to step 704, in response to selecting the supercritical control method (step 718), the controller determines a target temperature based on a dynamic pseudo-subcooling temperature value $T_{SC,dynamic}$ and the measured temperature $T_{GC}$ (step 720). The dynamic pseudo-subcooling temperature value $T_{SC,dynamic}$ can vary as a function of the measured temperature $T_{GC}$.

The controller determines a pseudo-saturated pressure $P^*_{sat}$ as a function of the target temperature (e.g., $T=T_{GC}+T_{SC,dynamic}$) (step 722). The pseudo-saturated pressure $P^*_{sat}$ calculated in step 722 is the pressure defined by pseudo-saturated line 610 at the target temperature $T=T_{GC}+T_{SC,dynamic}$.

The controller determines a pressure offset $\Delta P$ based on the target temperature T, an offset factor $\Delta P_{factor}$, and a maximum operating pressure $P_{max}$ of the refrigeration system (step 724). The offset pressure $\Delta P$ can provide additional subcooling. In some implementations, the pressure offset factor $\Delta P_{factor}$ is dynamically changed based on the measured temperature $T_{GC}$ and the maximum operating pressure $P_{max}$. In some implementations, the pressure offset factor is changed when the pseudo-saturation pressure $P^*_{sat}$ exceeds a value set by an enable parameter $\Delta P_{enable}$.

The controller determines a target pressure (e.g., the pressure setpoint $P_{sp}$) based on the pseudo-saturated pressure $P^*_{sat}$ determined in step 722 and the pressure offset $\Delta P$ determined in step 724, and the controller operates the high pressure valve 4 to achieve the pressure setpoint (step 726). Accordingly, the temperature of the $CO_2$ refrigerant at the exit of heat exchanger 2 will be $T_{GC}$ and the pressure of the $CO_2$ refrigerant at the exit of heat exchanger 2 will be, for example, $P^*_{sat}(T_{GC}+T_{SC,dynamic})+\Delta P$, which places the state of the $CO_2$ refrigerant along supercritical subcooled control line 614.

Figure 8:
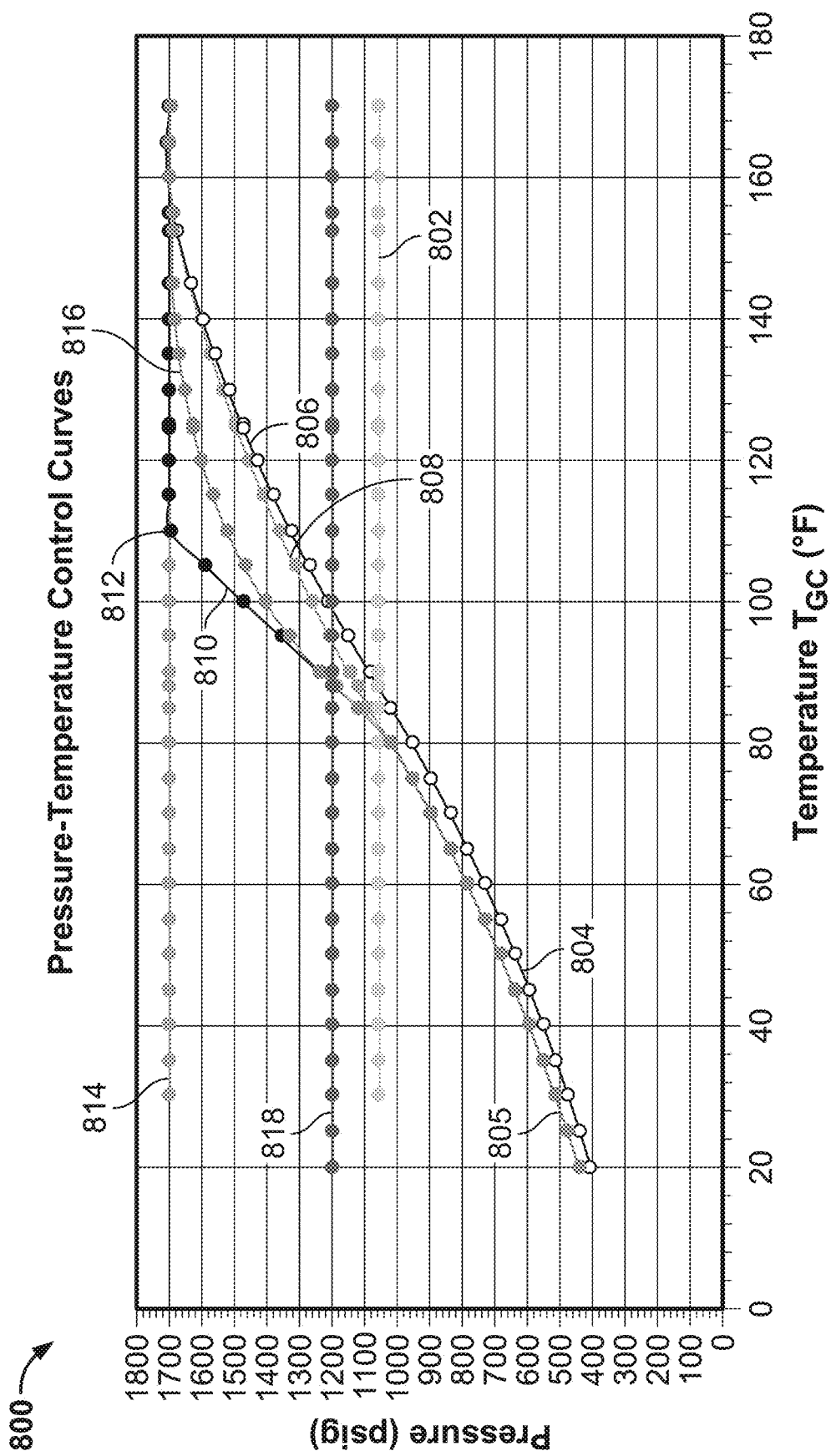
FIG. 8 is a plot of example pressure control curves obtained by an implementation of the process of FIG. 7.

FIG. 8 shows example control curves 800 based on implementations of the process 700. Line 802 shows the critical pressure $P_{crit}$ of the $CO_2$ refrigerant. Line 804 is the saturated liquid line. An example subcooled control line 805 based on a fixed subcooling temperature $T_{SC,fixed}=5°$ F. The pressure along the subcooled control line 805 is higher for a given measured temperature $T_{GC}$ than the saturated pressure for that temperature.

An example pseudo-saturated line 806 is shown corresponding to the pseudo-saturated pressure at the measured temperature, $P^*_{sat}(T_{GC})$. An example pseudo-subcooled control line 808 is shown based on the dynamic pseudo-subcooling temperature $T_{SC,dynamic}$. As the temperature increases, the value of $T_{SC,dynamic}$ decreases, and the pseudo-subcooled control line 808 approaches the pseudo-saturated line 806.

An example pressure offset pseudo-subcooled control line 810 using a pressure offset $\Delta P$ is shown. An equivalent maximum temperature $T_{max,eq}$ 812 is determined based on the value of the pressure offset $\Delta P$ and the set maximum operating pressure 814, which in this example is 1700 psig.

A larger value of ΔP will result in a lower value of $T_{max,eq}$. The value of the pressure offset ΔP for a given temperature in this example is the pressure difference between the pressure offset pseudo-subcooled control line 810 and the pseudo-subcooled line 808 at the given temperature. The value of ΔP can be user specified.

An example dynamic pressure offset pseudo-subcooled control line 816 is shown. Dynamic adjustment of the value of the pressure offset ΔP starts at the enable pressure $ΔP_{enable}$ 818, which is 1200 psig in this example. Below the enable pressure, the control line 816 matches the control line 810. Above the enable pressure, the value of the pressure offset ΔP decreases with increasing temperature asymptotically approaching the maximum pressure 814.

A number of implementations have been described. Nevertheless, it will be understood that various modifications can be made without departing from the spirit and scope of the disclosure. For example, example operations, methods, or processes described herein can include more steps or fewer steps than those described. Further, the steps in such example operations, methods, or processes can be performed in different successions than that described or illustrated in the figures. Accordingly, other implementations are within the scope of the following claims.

What is claimed is:

1. A refrigeration system comprising:
   a heat exchanger configured to remove heat from a refrigerant and discharge the refrigerant into a conduit;
   a temperature sensor located along the conduit and configured to measure a temperature of the refrigerant discharging from the heat exchanger;
   a pressure sensor located along the conduit and configured to measure a pressure of the refrigerant discharging from the heat exchanger;
   a pressure control valve located along the conduit and operable to regulate the pressure of the refrigerant leaving the heat exchanger; and
   a controller communicably coupled to the temperature sensor, the pressure sensor, and the pressure control valve and configured to perform operations comprising:
   determining that the refrigerant leaving the heat exchanger is outside of a subcritical region based on at least one of the measured temperature of the refrigerant and the measured pressure of the refrigerant;
   determining a target temperature that is based at least in part on a pseudo-subcooling temperature value and the measured temperature of the refrigerant;
   determining a supercritical pseudo-saturated pressure based on the target temperature;
   determining an offset factor for a pressure offset, the offset factor comprising a dynamic value based at least in part on the measured temperature of the refrigerant, a dynamic offset factor enable setpoint, and a maximum operating pressure of the refrigeration system;
   determining the pressure offset based on the target temperature, the maximum operating pressure of the refrigeration system, and the offset factor comprising the dynamic value; and
   operating the pressure control valve to drive the pressure of the refrigerant leaving the heat exchanger to a target pressure that is based on the supercritical pseudo-saturated pressure and the pressure offset.

2. The refrigeration system of claim 1, wherein the offset factor comprises a user specified value.

3. The refrigeration system of claim 1, wherein the operation of determining the dynamic value of the offset factor is further based on a user specified vapor ratio of a flash tank.

4. The refrigeration system of claim 1, wherein the operation of determining the target temperature comprises a sum of the pseudo-subcooling temperature value and the measured temperature of the refrigerant.

5. The refrigeration system of claim 1, wherein the target pressure comprises a sum of the supercritical pseudo-saturated pressure and the pressure offset.

6. The refrigeration system of claim 1, wherein the operations further comprise:
   generating a supercritical pseudo-saturation function for the refrigerant using supercritical pressure (P), enthalpy (H), and temperature (T) data for the refrigerant; and
   determining the supercritical pseudo-saturated pressure using the supercritical pseudo-saturation function.

7. The refrigeration system of claim 6, wherein the operation of generating the supercritical pseudo-saturation function comprises:
   identifying inflection points of supercritical P-H isotherms for the refrigerant using the supercritical P-H-T data for the refrigerant; and
   deriving the supercritical pseudo-saturation function from the inflection points of the supercritical P-H isotherms.

8. The refrigeration system of claim 7, wherein the operation of deriving the supercritical pseudo-saturation function from the inflection points of the supercritical P-H isotherms comprises fitting a supercritical pseudo-saturated line to the inflection points of the supercritical P-H isotherms.

9. The refrigeration system of claim 1, wherein the pseudo-subcooling temperature value is a dynamic value, and the operations further comprise determining the dynamic pseudo-subcooling temperature value based at least in part on the measured temperature of the refrigerant discharging from the heat exchanger.

10. The refrigeration system of claim 9, wherein the operation of determining the dynamic pseudo-subcooling temperature value comprises a function comprising a negative slope.

11. The refrigeration system of claim 1, wherein:
    the pseudo-subcooling temperature value is one of a plurality of pseudo-subcooling temperature values, each of which applies to a corresponding temperature of the refrigerant discharging from the heat exchanger; and
    default values of the plurality of pseudo-subcooling temperature values are adjustable by a user to control the pressure of the refrigerant discharging from the heat exchanger to higher or lower pressures at any measured temperature of the refrigerant discharging from the heat exchanger.

12. The refrigeration system of claim 1, wherein the operations further comprise:
    determining that the refrigerant discharging from the heat exchanger is in the subcritical region;
    determining a second target temperature based on a fixed temperature value and the measured temperature of the refrigerant;
    determining a subcritical saturated pressure based on the second target temperature; and
    operating the pressure control valve to drive the pressure of the refrigerant discharging from the heat exchanger to the subcritical saturated pressure corresponding to the second target temperature.

13. A method, comprising:
operating a refrigeration system that comprises a heat exchanger configured to remove heat from a refrigerant and discharge the refrigerant into a conduit, a temperature sensor located along the conduit, a pressure sensor located along the conduit, and a pressure control valve located along the conduit;
measuring a temperature of the refrigerant discharging from the heat exchanger;
measuring a pressure of the refrigerant discharging from the heat exchanger;
determining that the refrigerant discharging from the heat exchanger is outside of a subcritical region based on at least one of the measured temperature of the refrigerant or the measured pressure of the refrigerant;
determining a target temperature that is based at least in part on a pseudo-subcooling temperature value and the measured temperature of the refrigerant;
determining a supercritical pseudo-saturated pressure based on the target temperature;
determining an offset factor for a pressure offset, the offset factor comprising a dynamic value based at least in part on the measured temperature of the refrigerant, a dynamic offset factor enable setpoint, and a maximum operating pressure of the refrigeration system;
determining the pressure offset based on the target temperature, the maximum operating pressure of the refrigeration system, and the offset factor comprising the dynamic value; and
operating the pressure control valve to drive the pressure of the refrigerant discharging from the heat exchanger to a target pressure that is based on the supercritical pseudo-saturated pressure and the pressure offset.

14. The method of claim 13, wherein the offset factor comprises a user specified value.

15. The method of claim 13, wherein determining the dynamic value of the offset factor is further based on a user specified vapor ratio of a flash tank.

16. The method of claim 13, wherein determining the target temperature comprises a sum of the pseudo-subcooling temperature value and the measured temperature of the refrigerant.

17. The method of claim 13, wherein the target pressure comprises a sum of the supercritical pseudo-saturated pressure and the pressure offset.

18. The method of claim 13, further comprising:
generating a supercritical pseudo-saturation function for the refrigerant using supercritical pressure (P), enthalpy (H), and temperature (T) data for the refrigerant; and
determining the supercritical pseudo-saturated pressure using the supercritical pseudo-saturation function.

19. The method of claim 18, wherein generating the supercritical pseudo-saturation function comprises:
identifying inflection points of supercritical P-H isotherms for the refrigerant using the supercritical P-H-T data for the refrigerant; and
deriving the supercritical pseudo-saturation function from the inflection points of the supercritical P-H isotherms.

20. The method of claim 19, wherein deriving the supercritical pseudo-saturation function from the inflection points of the supercritical P-H isotherms comprises fitting a supercritical pseudo-saturated line to the inflection points of the supercritical P-H isotherms.

21. The method of claim 13, wherein the pseudo-subcooling temperature value is a dynamic value, and the method further comprises determining the dynamic pseudo-subcooling temperature value based at least in part on the measured temperature of the refrigerant discharging from the heat exchanger.

22. The method of claim 21, wherein the determining the dynamic pseudo-subcooling temperature value comprises a function comprising a negative slope.

23. The method of claim 13, wherein:
the pseudo-subcooling temperature value is one of a plurality of pseudo-subcooling temperature values, each of which applies to a corresponding temperature of the refrigerant discharging from the heat exchanger; and
default values of the plurality of pseudo-subcooling temperature values are adjustable by a user to control the pressure of the refrigerant discharging from the heat exchanger to higher or lower pressures at any measured temperature of the refrigerant discharging from the heat exchanger.

24. The method of claim 13, further comprising:
determining that the refrigerant discharging from the heat exchanger is in the subcritical region;
determining a second target temperature based on a fixed temperature value and the measured temperature of the refrigerant;
determining a subcritical saturated pressure based on the second target temperature; and
operating the pressure control valve to drive the pressure of the refrigerant discharging from the heat exchanger to the subcritical saturated pressure corresponding to the second target temperature.

* * * * *